(12) United States Patent
Wigren et al.

(10) Patent No.: US 11,601,175 B2
(45) Date of Patent: *Mar. 7, 2023

(54) METHODS AND DEVICES FOR DETERMINING SUITABLE TRANSMIT DIRECTIONS FOR BEAMFORMED TRANSMISSION

(71) Applicant: Telefonaktiebolaget LM Ericsson (publ), Stockholm (SE)

(72) Inventors: Torbjörn Wigren, Uppsala (SE); Oskar Mauritz, Johanneshov (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/450,983

(22) Filed: Oct. 14, 2021

(65) Prior Publication Data
US 2022/0038152 A1    Feb. 3, 2022

Related U.S. Application Data

(60) Continuation of application No. 16/776,499, filed on Jan. 29, 2020, now Pat. No. 11,184,068, which is a
(Continued)

(51) Int. Cl.
*H04B 7/06* (2006.01)
*H04W 36/00* (2009.01)
(Continued)

(52) U.S. Cl.
CPC .......... *H04B 7/0617* (2013.01); *H04B 7/043* (2013.01); *H04B 7/0621* (2013.01);
(Continued)

(58) Field of Classification Search
CPC .... H04B 7/0617; H04B 7/043; H04B 7/0621; H04B 7/0643; H04B 7/0695; H04B 7/086;
(Continued)

(56) References Cited

U.S. PATENT DOCUMENTS 6,167,286 A * 12/2000 Ward ............... H04B 7/086
455/562.1
2010/0265924 A1   10/2010 Yong et al.
(Continued)

FOREIGN PATENT DOCUMENTS

WO   2009/114631 A1   9/2009
WO   2014/116811 A1   7/2014
(Continued)

OTHER PUBLICATIONS

Bo Gao et al., "IEEE P802.11 Wireless LANs, Proposed text resolution to CID 145 in CC12," Jan. 15, 2015, pp. 1-10, IEEE 802.11-14/0762r3, Tsinghua University, Beijing, China.
(Continued)

*Primary Examiner* — Vineeta S Panwalkar
(74) *Attorney, Agent, or Firm* — Nicholson De Vos Webster & Elliott LLP

(57) ABSTRACT

Methods, devices and computer programs for determining new transmit directions to use for beamformed transmissions in case the link quality of an existing direction falters. A transmitting communication device and a receiving communication device cooperate via a beam tracking procedure to determine a new suitable transmit direction to use for upcoming beamformed transmissions. Information relating to the beam tracking procedure is communicated over an existing link that enables communication between the transmitting and receiving communication devices. The receiving communication device provides the transmitting communi-
(Continued)

cation device with information about a beam scan performed in order to detect tracking beams transmitted by the transmitting communication device. This information allows the transmitting communication device to determine suitable transmit directions to use.

24 Claims, 17 Drawing Sheets

Related U.S. Application Data division of application No. 15/764,825, filed as application No. PCT/SE2015/051024 on Sep. 29, 2015, now Pat. No. 10,554,278.

(51) Int. Cl.
  *H04W 16/28* (2009.01)
  *H04B 7/0426* (2017.01)
  *H04W 76/11* (2018.01)
  *H04B 7/08* (2006.01)

(52) U.S. Cl.
  CPC ......... *H04B 7/0643* (2013.01); *H04B 7/0695* (2013.01); *H04B 7/086* (2013.01); *H04W 16/28* (2013.01); *H04W 36/0072* (2013.01); *H04W 76/11* (2018.02)

(58) Field of Classification Search
  CPC .. H04W 16/28; H04W 36/0072; H04W 76/11
  See application file for complete search history.

(56) References Cited

U.S. PATENT DOCUMENTS

| | | |
|---|---|---|
| 2013/0182666 A1 | 7/2013 | Sutskover et al. |
| 2013/0201938 A1 | 8/2013 | Seol et al. |
| 2015/0124738 A1 | 5/2015 | Ramakrishna et al. |
| 2016/0006122 A1 | 1/2016 | Seol et al. |
| 2016/0323756 A1 | 11/2016 | Shen et al. |
| 2017/0134083 A1 | 5/2017 | Kim et al. |

FOREIGN PATENT DOCUMENTS

| | | |
|---|---|---|
| WO | 2016/045695 A1 | 3/2016 |
| WO | 2016/055102 A1 | 4/2016 |
| WO | 2016/095984 A1 | 6/2016 |

OTHER PUBLICATIONS

Ericsson et al., "New SI proposal: Study on Latency reduction techniques for LTE," Mar. 9-12, 2015, 7 pages, 3GPP TSG RAN Meeting #67, RP-150465, Shanghai, China.
European Search Report and Search Opinion, EP App. No. 21178168. 7, dated Sep. 24, 2021, 14 pages.
Intention to Grant, EP App. No. 15779040.3, dated Feb. 18, 2021, 144 pages.
International Preliminary Report on Patentability for International Application No. PCT/SE2015/051024, dated Apr. 12, 2018, 9 pages.
International Search Report and Written Opinion for International Application No. PCT/SE2015/051024, dated Jun. 30, 2016, 14 pages.
Non-Final Office Action, U.S. Appl. No. 16/776,499, dated Mar. 4, 2021, 11 pages.
Non-Final Rejection U.S. Appl. No. 15/764,825, dated Jul. 10, 2019, 15 pages.
Notice of Allowance U.S. Appl. No. 15/764,825, dated Oct. 18, 2019, 9 pages.
Notice of Allowance, U.S. Appl. No. 16/776,499, dated Jun. 24, 2021, 8 pages.
Requirement for Restriction/Election U.S. Appl. No. 15/764,825, dated Apr. 1, 2019, 5 pages.

\* cited by examiner

METHODS AND DEVICES FOR DETERMINING SUITABLE TRANSMIT DIRECTIONS FOR BEAMFORMED TRANSMISSION

CROSS-REFERENCE TO RELATED APPLICATIONS

This application is a continuation of application Ser. No. 16/776,499, filed Jan. 29, 2020, which is a divisional of application Ser. No. 15/764,825, filed Mar. 29, 2018 (now U.S. Pat. No. 10,554,278 issued Feb. 4, 2020), which is a National stage of International Application No. PCT/SE2015/051024, filed Sep. 29, 2015, which are all hereby incorporated by reference.

TECHNICAL FIELD

The proposed technology generally relates to methods that enables a determination of suitable transmit directions for beamformed transmission between communication devices. The proposed technology also relates devices and computer programs corresponding to the methods.

BACKGROUND ART

In future cellular 5G systems new spectrum at significantly higher carrier frequencies will be used. This introduces a number of problems. First of all, the reference dipole antenna area is reduced, which reduces range and coverage as compared to present cellular technology. Moreover, new radio frequency electromagnetic field requirements limits the transmit power to less than 13 dB above 6 GHz, which in turn reduces range and coverage as compared to present cellular systems. Another problem relates to the fact that for higher carrier frequencies certain radio propagation effects, in particular diffraction, i.e. shadowing, and obstacle penetration losses increases. These increased losses will in turn reduce the range and coverage as compared to present cellular systems.

The above challenges and others require a shift towards quite massive beamforming. This is the one foreseen solution that provide the antenna gain needed to reach a sufficient range and coverage. Beamforming is a technique to form the antenna gain of an antenna array by application of suitable phase shifts to each of the antenna elements of the array. In that way, constructive combination of the radio wave wave-fronts of each antenna elements tends to amplify the signal in selected directions. Similarly destructive combination tends to reduce the effective signal in other directions.

Beamforming can in general be performed on both analogue signals as well as digital signals. In case of analogue beamforming, the analogue transmit signal is sent to a set of antenna elements, one set for each Multiple Input Multiple Output layer, MIMO layer. The phase shift of each antenna in a set is then controlled in a way to create the radio beam.

The advantage of analogue beamforming is that a digital to analogue conversion does require a number of AD/DA converters that is equal to the number of spatial multiplexing layers. This number is likely to be much lower than the number of antenna elements, since the majority of the degrees of freedom are to be used for beamforming. The downside is a lack of flexibility in that all resource blocks, for example the case of OFDM type multiple access as in the LTE system, are subject to the same beamforming. This is only consistent with the scheduling of users in a single direction per beam, at each time instant and for all frequencies of the band.

In case of digital beamforming each antenna element is equipped with a separate AD/DA converter. This allows beamforming weights to be added in base band, rather than in the analogue domain. The advantage of this solution in turn is flexibility, since each user can be given a separate beamforming at the same time. It is therefore no longer necessary to limit the scheduling to users in a single direction. The drawback is instead that there is a need for a large number of AD/DA converters. This leads to extensive costs and to a large power consumption.

As stated above, a low cost analogue beamformer uses the same beam pattern for the whole radio frequency band, at a given point in time. Since the beamformed antenna gain is highly directional and since wireless devices such as User Equipments, UEs, are located in individual directions as counted from a base station, only one or a few UEs can be communicated with in a given point in time. This means that the antenna patterns need to be changed over time to direct the power to each UE in a cell.

Some further drawbacks with the known beamforming technology include the fact that in the case that a low power and low cost beamforming solutions are sought, then the flexibility with digital beamforming lost. The analogue beamforming on the other hand need to be able to handle multiple beams per users, to capture reflected energy at higher carrier frequencies. This furthermore requires complex recalculations of phase shifts and reduces the antenna gain in each direction. Alternatively, very large phase shifting tables are needed. There is also a need to continuously search for new beam directions and to initiate tracking of such beams. This is complicated by the directional properties of the 5G radio propagation, at high carrier frequencies.

The beamforming technology to be utilized also need to reflect the fact that the propagation in general becomes more beamlike when the carrier frequency increases. As a direct consequence of this, there is only a few directions available at a time for beamformed based communication between two static, i.e. non-moving, communication devices since the beam transmitting device only can reach the receiving device with a beam if the receiving device lies within cross-section area of the beam. This is further complicated by the fact that wireless devices may move within the cells. A relative movement between the communicating devices will render the initially available directions unusable. The initially available directions may also become unusable even for static communication devices, such as two radio base stations, if there are changes in the environment. A particular example may be that a house or some other construction is raised between the radio base station thereby blocking the initially available transmit direction. This particular drawback with beamformed transmissions needs to be addressed to obtain an efficient use of the high carrier frequencies utilized in, for example, 5G-network technology.

The proposed technology aims to at least partially overcome the mentioned drawbacks of the prior art solutions.

One suggestion for handling beamforming is provided by REF. [1]. REF. [1] discloses bidirectional iterative beam forming techniques. An apparatus such as a wireless device having an antenna control module is operative to initiate beam formation operations using an iterative training scheme to form a pair of communications channels for a wireless network.

SUMMARY OF THE INVENTION

It is an object to provide a mechanism that makes it possible for communication devices to communicate with each other by means of beamformed transmissions even if the transmit and receive directions of the beams are obstructed. It is a particular object to provide a mechanism that provides a dynamical way to find beam transmit directions that can be used for communication between two communicating devices. The proposed mechanism also makes it possible to utilize analogue beamforming in extended fashion. This will lead to beamforming methods with reduced complexity as well as reduced costs.

These and other objects are met by embodiments of the proposed technology.

According to a first aspect, there is provided a method performed by a transmitting communication device for determining beam directions suitable to use for communication between the transmitting communication device and a receiving communication device, the transmitting communication device and the receiving communication device being connected through an existing radio link. The method comprises the step of triggering, by means of a message transmitted over the existing radio link, the receiving communication device to perform a beam scan. The method also comprises the step of transmitting, according to a pre-determined transmission scheme, tracking beams in different transmit directions, to enable the receiving communication device to perform the beam scan for each transmit direction in order to detect a transmitted tracking beam. The method also comprises the step of receiving information about the outcome of the performed beam scan from the receiving communication device over the existing radio link, the information comprising information that enables the transmitting communication device to identify at least one transmit direction that led to a detection of a tracking beam during the performed beam scan. The method also comprises the step of determining, based on the received information, a suitable transmit direction to use for beamformed transmissions to the receiving communication device.

According to a second aspect there is provided a beam scanning method performed by a receiving communication device to enable the determination of beam directions suitable to use for communication between the receiving communication device and a transmitting communication device, the receiving communication device and the transmitting communication device being connected through an existing radio link. The method comprises the step of performing, when triggered by a message received from the transmitting communication device over the existing radio link, a beam scan over different receive directions in order to detect tracking beams transmitted by the transmitting communication device. The method also comprises the step of collecting information about the outcome of the performed beam scan, the information comprising information that enables the transmitting communication device to identify at least one transmit direction corresponding to a detected tracking beam. The method further comprises the step of transmitting the collected information to the transmitting communication device over the existing radio link.

According to a third aspect there is provided a transmitting communication device configured for determining beam directions suitable to use for communication between the transmitting communication device and a receiving communication device, the transmitting communication device and the receiving communication device being connected through an existing radio link. The transmitting communication device is configured to trigger, by means of a message transmitted over the existing radio link, the receiving communication device to perform a beam scan. The transmitting communication device is also configured to transmit, according to a pre-determined transmission scheme, tracking beams in different transmit directions, to enable the receiving communication device to perform the beam scan for each transmit direction in order to detect a transmitted tracking beam. The transmitting communication device is also configured to receive information about the outcome of the performed beam scan from the receiving communication device over the existing radio link, the information comprising information that enables the transmitting communication device to identify at least one transmit direction that led to a detection of a tracking beam during the performed beam scan. The transmitting communication device is also configured to determine, based on the received information, a suitable transmit direction to use for beamformed transmissions to the receiving communication device.

According to a fourth aspect there is provided a receiving communication device configured to perform a beam scan to enable the determination of beam directions suitable to use for communication between the receiving communication device and a transmitting communication device, the receiving communication device and the transmitting communication device being connected through an existing radio link. The receiving communication device is configured to perform, when triggered by a message received from the transmitting communication device over the existing radio link, a beam scan over different receive directions in order to detect tracking beams transmitted by the transmitting communication device. The receiving communication device is also configured to collect information about the outcome of the performed beam scan, the information comprising information that enables the transmitting communication device to identify at least one transmit direction corresponding to a detected tracking beam. The receiving communication device is also configured to transmit the collected information to the transmitting communication device over the existing radio link.

According to a fifth aspect there is provided method performed by a wireless device for determining beam directions suitable to use for communication between the wireless device and a radio base station, the wireless device and the radio base station being connected through an existing radio link. The method comprises the step of transmitting, when triggered by a message received from the radio base station and according to a pre-determined transmission scheme, tracking beams in different transmit directions to enable the radio base station to perform the beam scan for each transmit direction in order to detect a transmitted tracking beam. The method also comprises the step of receiving information about the outcome of the performed beam scan from the radio base station over the existing radio link, said information comprising information that enables the wireless device to identify at least one transmit direction that led to a detection of a tracking beam during the performed beam scan. The method further comprises the step of determining, based on the received information, a suitable transmit direction to use for beamformed transmissions to the radio base station.

According to a sixth aspect there is provided a beam scanning method performed by a radio base station to enable the determination of beam directions suitable to use for communication between the radio base station and a wireless device, the radio base station and the wireless device being connected through an existing radio link. The method comprises the step of triggering, by means of a message transmitted over the existing radio link, the wireless device to perform a transmission of tracking beams. The method also comprises the step of performing a beam scan in order to detect tracking beams transmitted by the wireless device. The method further comprises the step of collecting information about the outcome of the performed beam scan, said information comprising information that enables the wireless device to identify at least one transmit direction corresponding to a detected tracking beam. The method further comprises the step of transmitting the collected information to the wireless device over the existing radio link.

According to a seventh aspect there is provided a wireless device configured to determine beam directions suitable to use for communication between the wireless device and a radio base station, the wireless device and the radio base station being connected through an existing radio link. The wireless device is configured to transmit, when triggered by a message received from the radio base station over the existing radio link and according to a pre-determined transmission scheme, tracking beams in different transmit directions, to enable the radio base station to perform the beam scan for each transmit direction in order to detect a transmitted tracking beam. The wireless device is also configured to receive information about the outcome of the performed beam scan from the radio base station over the existing radio link, said information comprising information that enables the wireless device to identify at least one transmit direction that led to a detection of a tracking beam during the performed beam scan. The wireless device is further configured to determine, based on the received information, a suitable transmit direction to use for beamformed transmissions to the radio base station.

According to an eighth aspect there is provided a radio base station that is configured to perform a beam scan to enable the determination of beam directions suitable to use for communication between the radio base station and a wireless device, the radio base station and the wireless device being connected through an existing radio link. The radio base station is configured to trigger, by means of a message transmitted over the existing radio link, the wireless device to perform a transmission of tracking beams in different transmit directions according to a pre-determined transmission scheme. The radio base station is also configured to perform a beam scan in order to detect tracking beams transmitted by the wireless device. The radio base station is further configured to collect information about the outcome of the performed beam scan, said information comprising information that enables the wireless device to identify at least one transmit direction corresponding to a detected tracking beam. The radio base station is configured to transmit the collected information to the wireless device over the existing radio link.

According to a ninth aspect there is provided computer program comprising instructions, which when executed by at least one processor, cause the at least one processor to:
initiate a transmission of a message to a receiving communication unit over an existing radio link in order to trigger the receiving unit to perform a beam scan;
initiate a transmission of tracking beams in transmit directions that alternates over time, where a switch of transmit direction may be made at specific intervals, to enable the receiving communication unit to perform a beam scan for each transmit direction in order to detect a transmitted tracking beam;
read information about the outcome of the performed beam scan, said information comprising information of at least one transmit direction that led to a detection of a tracking beam during the performed beam scan;

determine, based on the read information, a suitable transmit direction to use for beamformed transmissions to the receiving communication unit.

According to a tenth aspect there is provided a computer program comprising instructions, which when executed by at least one processor, cause the at least one processor to:
initiate a beam scan over different receive directions in order to detect tracking beams transmitted by a transmitting communication unit;
collect information about the outcome of the performed beam scan, said information comprising information that enables the transmitting communication unit to identify at least one transmit direction corresponding to a detected tracking beam;
create a message to be transmitted to the transmitting communication unit that comprises the collected information.

According to an eleventh aspect there is provided computer program comprising instructions, which when executed by at least one processor, cause the at least one processor to:
initiate a transmission of tracking beams in different transmit directions according to a pre-determined transmission scheme, to enable a radio base station to perform a beam scan for each transmit direction in order to detect a transmitted tracking beam
read information about the outcome of the performed beam scan said information comprising information of at least one transmit direction that led to a detection of a tracking beam during the performed beam scan
determine, based on the read information, a suitable transmit direction to use for beamformed transmissions to the radio base station.

According to a twelfth aspect there is provided computer program comprising instructions, which when executed by at least one processor, cause the at least one processor to:
initiate the transmission of a message to a wireless device over an existing radio link to trigger the wireless device to perform a transmission of tracking beams in different transmit directions according to a pre-determined transmission scheme
initiate a beam scan in order to detect tracking beams transmitted by the wireless device
collect information about the outcome of the performed beam scan, said information comprising information of at least one transmit direction that led to a detected tracking beam
create a message, comprising the collected information, to be transmitted to the wireless device over the existing radio link.

According to a thirteenth aspect there is provided an apparatus for determining beam directions suitable to use for communication between a transmitting communication unit and a receiving communication unit, the transmitting communication unit and the receiving communication unit being connected through an existing radio link. The apparatus comprises:
an initiation module for initiating the transmission of a message to a receiving communication unit over an existing radio link in order to trigger the receiving unit to perform a beam scan
a transmission initiation module for initiating a transmission of tracking beams in different transmit directions according to a pre-determined transmission scheme, to enable the receiving communication unit to perform a beam scan for each transmit direction in order to detect a transmitted tracking beam a reading module for reading information about the outcome of the performed beam scan, said information comprising information of at least one transmit direction that led to a detection of a tracking beam during the performed beam scan a processing module for determining, based on the read information, a suitable transmit direction to use for beamformed transmissions to the receiving communication unit.

According to a fourteenth aspect there is provided an apparatus for enabling the determination of beam directions suitable to use for communication between a receiving communication unit and a transmitting communication unit, the receiving communication unit and the transmitting communication unit being connected through an existing radio link. The apparatus comprises:

a scan initiation module for initiating a beam scan over different receive directions in order to detect tracking beams transmitted by a transmitting communication unit a collecting module for collecting information about the outcome of the performed beam scan, said information comprising information that enables the transmitting communication unit to identify at least one transmit direction corresponding to a detected tracking beam a creation module for creating a message to be transmitted to the transmitting communication unit that comprises the collected information.

According to a fifteenth aspect there is provided an apparatus for determining beam directions suitable to use for communication between a wireless device and a radio base station, the wireless device and the radio base station being connected through an existing radio link. The apparatus comprises:

an initiation module for initiating a transmission of tracking beams in different transmit directions according to a pre-determined transmission scheme, to enable a radio base station to perform a beam scan for each transmit direction in order to detect a transmitted tracking beam a reading module for reading information about the outcome of the performed beam scan said information comprising information of at least one transmit direction that led to a detection of a tracking beam during the performed beam scan a processing module for determining, based on the read information, a suitable transmit direction to use for beamformed transmissions to the radio base station.

According to a sixteenth aspect there is provided an apparatus for enabling the determination of beam directions suitable to use for communication between a radio base station and a wireless device, the radio base station and the wireless device being connected through an existing radio link. The apparatus comprises:

an initiation module for initiating the transmission of a message to a wireless device over an existing radio link triggering the wireless device to perform a transmission of tracking beams in different transmit directions according to a pre-determined transmission scheme a scan initiation module for initiating a beam scan in order to detect tracking beams transmitted by the wireless device a collecting module for collecting information about the outcome of the performed beam scan, said information comprising information of at least one transmit direction that led to a detected tracking beam a creation module for creating a message, to be transmitted to the wireless device, comprising the collected information.

Embodiments of the proposed technology enables beamtracking that does not reduce range and coverage as compared to single beam tracking. The embodiments furthermore provides for mechanisms that does not require advanced, complex and power hungry base band processing and corresponding A/D-D/A conversion for all or the majority of the antenna elements of the antenna array. The embodiments also provides for a flexibility when searching for new beams and initialize links for new users. The embodiments also allows for an efficient use of analogue beamforming which reduces the complexity and costs associated to beamforming.

Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

Throughout the drawings, the same reference designations are used for similar or corresponding elements.

Figure 5:
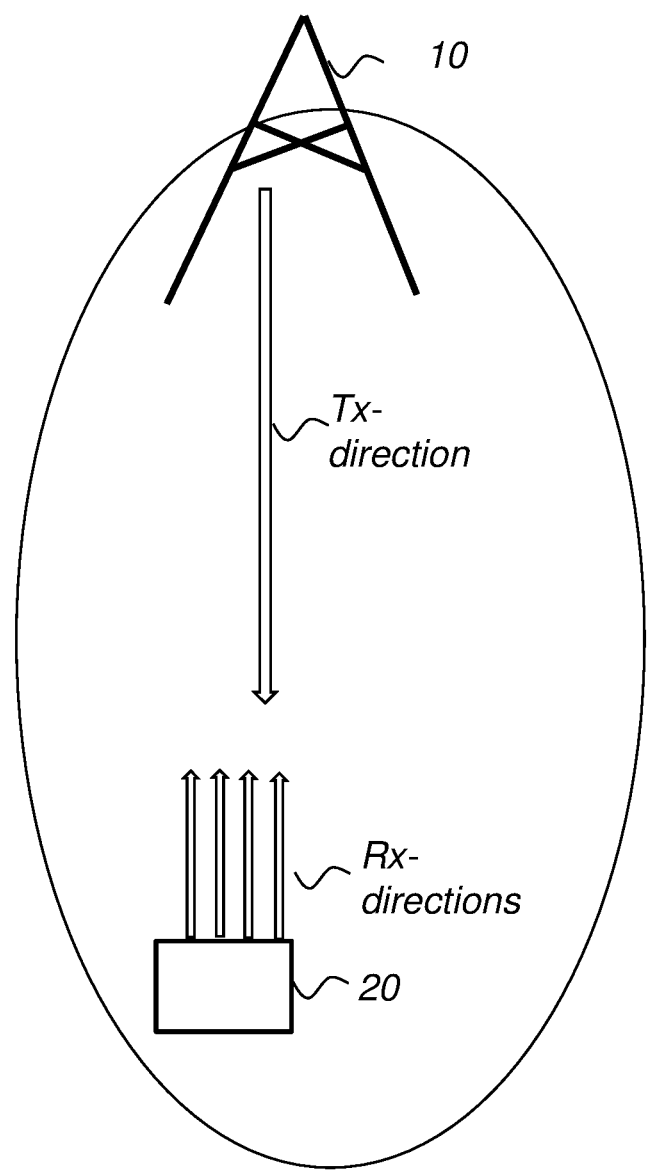
FIG. 5 illustrates how a transmitting communication device transmit a beam toward a receiving communication device and it also illustrates possible receive directions of the receiving communication device.

For a better understanding of the proposed technology, it may be useful to begin with a brief overview of beamforming transmissions between a transmitting device and a receiving device. Reference is made to FIG. 5 which illustrates two communication devices, a transmitting communication device 10 and a receiving communication device 20. It is illustrated how a transmitting communication device 10 transmit a beam in a particular transmit direction, Tx-direction, towards a receiving communication device 20. Also illustrated is a number of possible receive directions, Rx-directions, over which the receiving communication device is able to receive the beam in order to decode the signals carried by the beam. Even though the beams in FIG. 5 are illustrated as going in a more or less straight fashion from the transmitting communication device 10 to the receiving communication device 20, they typically traverses several reflections before being received by the receiving communication device 20. The drawing illustrates a static moment where the receiving communication device 20 is fixed relative the transmitting communication device 10 and can receive the beam in a particular receive direction.

This situation may however change, either due to a relative motion between the two communicating devices or if some spatial obstructions hinders the receiving communicating device 20 to receive the beam with high enough quality to be able to decode the content of the beam. In order to counter such scenarios, mechanisms has to designed that enables communicating devices to find new suitable transmit directions that can be used for communication even if the environment changes or there is a relative motion between the devices.

The proposed technology aims to provide just such a mechanism. It aims to provide a way whereby two communicating devices can determine new suitable transmit directions replacing older ones that do not yield a radio link of sufficient quality. Since this in turn enables a dynamical way to maintain communication channels even for beamformed transmissions, the mechanism is well suited to be used with analogue beamforming. The use of analogue beamforming provides for some positive features compared to digital beamforming. It provides a beamforming technique that is far less complex in comparison in that no pre-coding is needed since the phases are controlled analogously on the antenna elements. It also provides for a more cost efficient beamforming technology due to the fact that there is no need to use large numbers of rather expensive A/D-converters.

The proposed technology provides methods that enable the determination of a suitable transmit direction to use for beamformed communication between two communication devices. Before describing the details of the methods performed by the cooperating devices, a short and exemplary overview of the overarching procedure will be given. To this end reference is made to FIG. 6.

Figure 6:
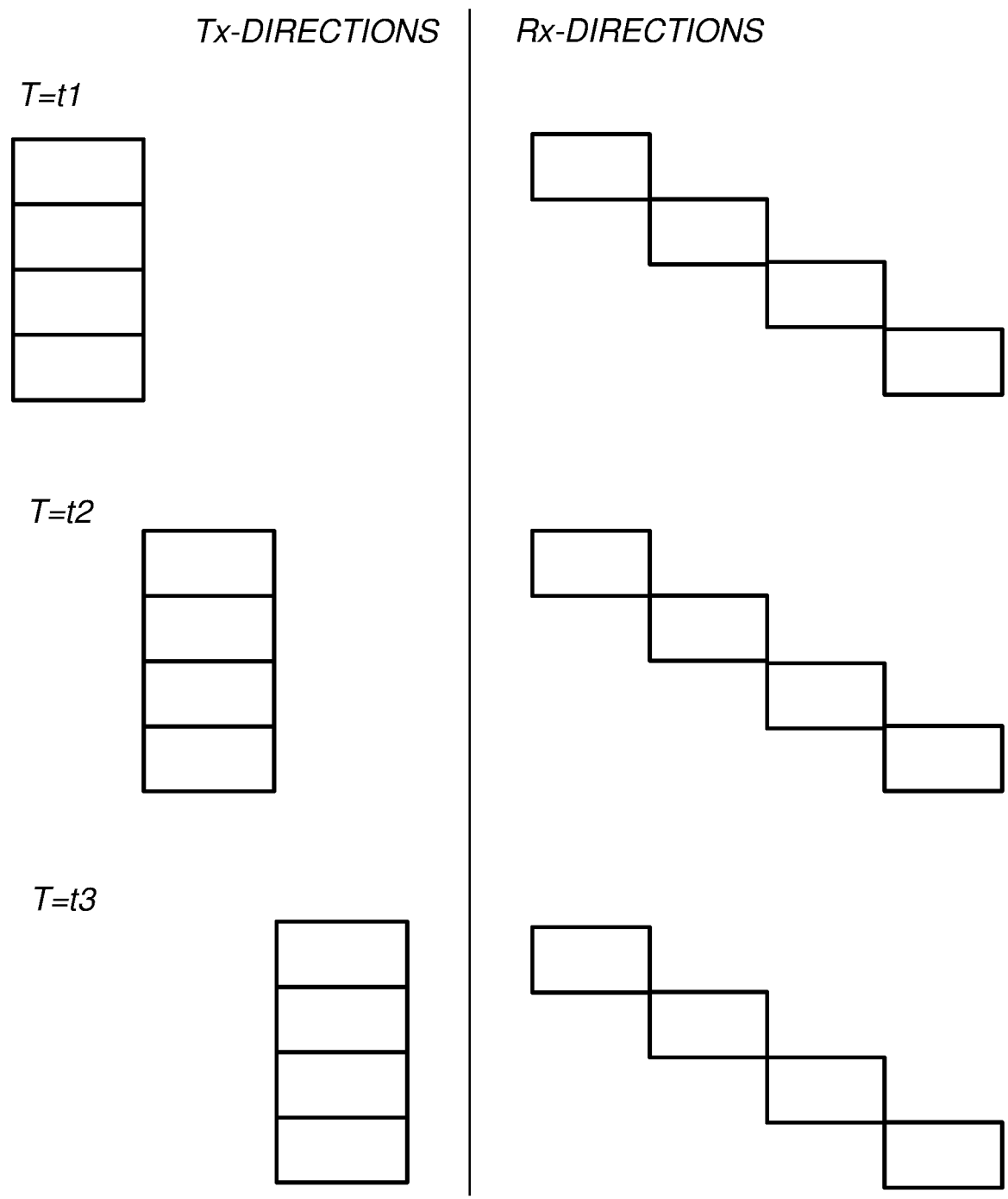
FIG. 6 illustrates a possible embodiment of a transmission- and receiving pattern that can be used according to the proposed technology.

FIG. 6 illustrates a possible embodiment of the proposed technology. A transmitting communication device transmit a number of tracking beams in various transmit directions. With tracking beams is here intended a beam transmitted in order to for a recipient to detect the beam. The beam may in various embodiments contain specific information to be decoded by the recipient while other embodiments only depend on detecting the energy of the tracking beam. In the particular illustrative example in FIG. 6, tracking beams are transmitted in three different transmit directions. At an initial time $T=t_0$, a first tracking beam is transmitted in a first transmit direction. At time $T=t_1$, the transmit direction is altered and a tracking beam is transmitted in a new direction. Another change of transmit direction is performed at $T=t_2$, leading to a tracking beam transmitted in a third transmit direction. On the opposite side the receiving communication device scans a number of possible receive directions in order to detect energy carried by the tracking beams. The number of receive directions for the receiving communication to scan are four in this particular example. Hence at time to, the receiving communication device scans four possible receive directions in order to detect energy carried by the first transmitted tracking beam. At time $T=t_1$, the receiving communication device scans the possible receive directions in order to detect energy carried by the second transmitted tracking beam. The same scanning procedure is then repeated for each consecutive time. The particular scanning pattern illustrated in FIG. 6 is only one of a number of possible scanning patterns that can be utilised. The number of transmit directions and receive directions may for example differ largely based on the particular circumstances. The time span during which a particular tracking beam is transmitted may also alternate to conform to the scanning procedure of the receiving device. The transmission and scanning pattern may also be periodic, whereby a tracking beam is transmitted in the first direction again after a particular time has passed.

A particular purpose of the transmission and scanning pattern is that the receiving communication device shall be able to scan possible receive directions in order to detect transmitted tracking beams. During detection of a tracking beam, the receiving communication device may also perform a measurement on the detected tracking beam in order to obtain a quality measure, for example a measure of the signal-to-interference to noise ratio, SINR, of the radio link defined by the transmit direction and receive direction. If the obtained quality measure provides an indication that the radio link is of sufficient quality to support beamformed communication, the particular transmit direction corresponding to the detected tracking beam may be chosen to be a suitable transmit direction for future communication between the transmitting and receiving communication device.

Figure 7:
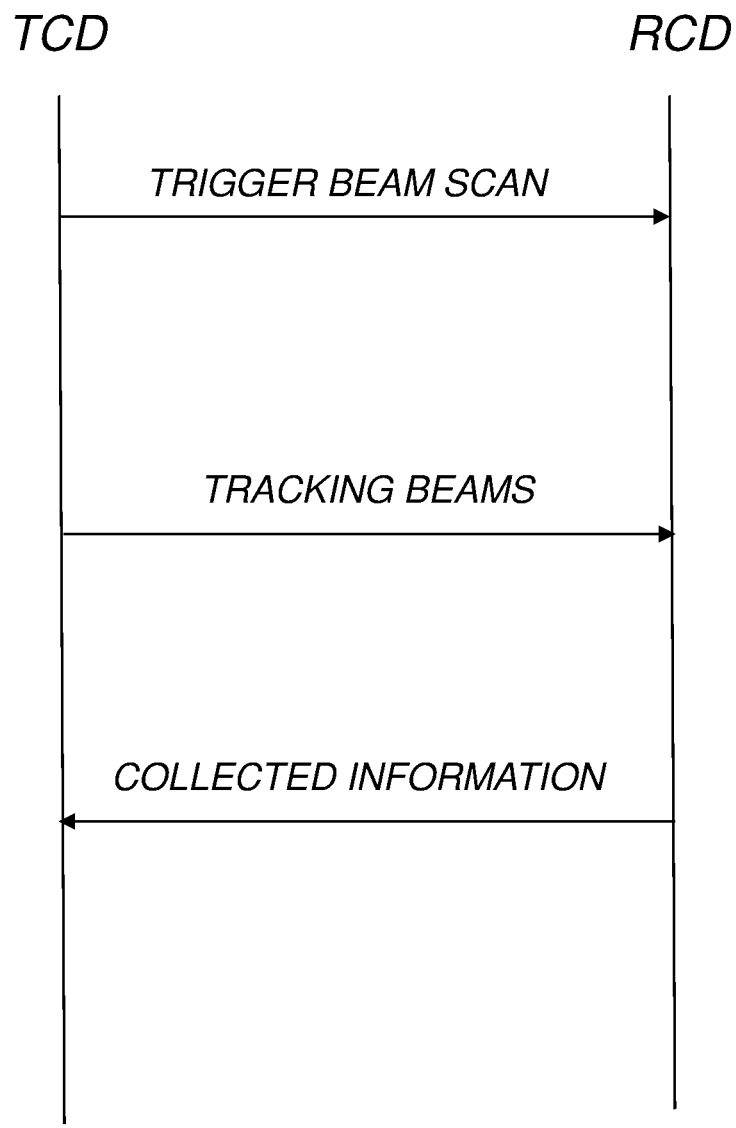
FIG. 7 is a signaling diagram illustrating how a transmitting communication device and a receiving communication device may communicate in order to perform a particular embodiment of the proposed technology.

To further illustrate the proposed technology reference is made to the signalling diagram of FIG. 7. FIG. 7 illustrates a particular example of the signalling between two different communicating devices, a transmitting communication device, TCD, and a receiving communication device, RCD. The communication devices are connected through an existing radio link that enables the devices to transmit information such as control information as well as messages between themselves. The existing radio link may be a radio communication channel utilizing transmissions by means of omnidirectional antennas instead of beamformed transmissions.

The TCD thus triggers the RCD to perform a beam scan by means of a message transmitted over the existing radio link.

Having triggered the RCD, the TCD transmit tracking beams in different transmit directions according to a particular pre-determined transmission scheme.

Subsequently the TCD receives, by means of a message transmitted from the RCD over the existing radio link, information relating to the outcome of the beam scan performed by the RCD. Having obtained this information, the RCD will be able to determine a suitable transmit direction to use for upcoming, or future, beamformed transmissions to the RCD.

Having described a more broad-brushed picture of a particular embodiment of the proposed technology, in what follows a more detailed description of the methods performed by the cooperating devices will be given.

Figure 1:
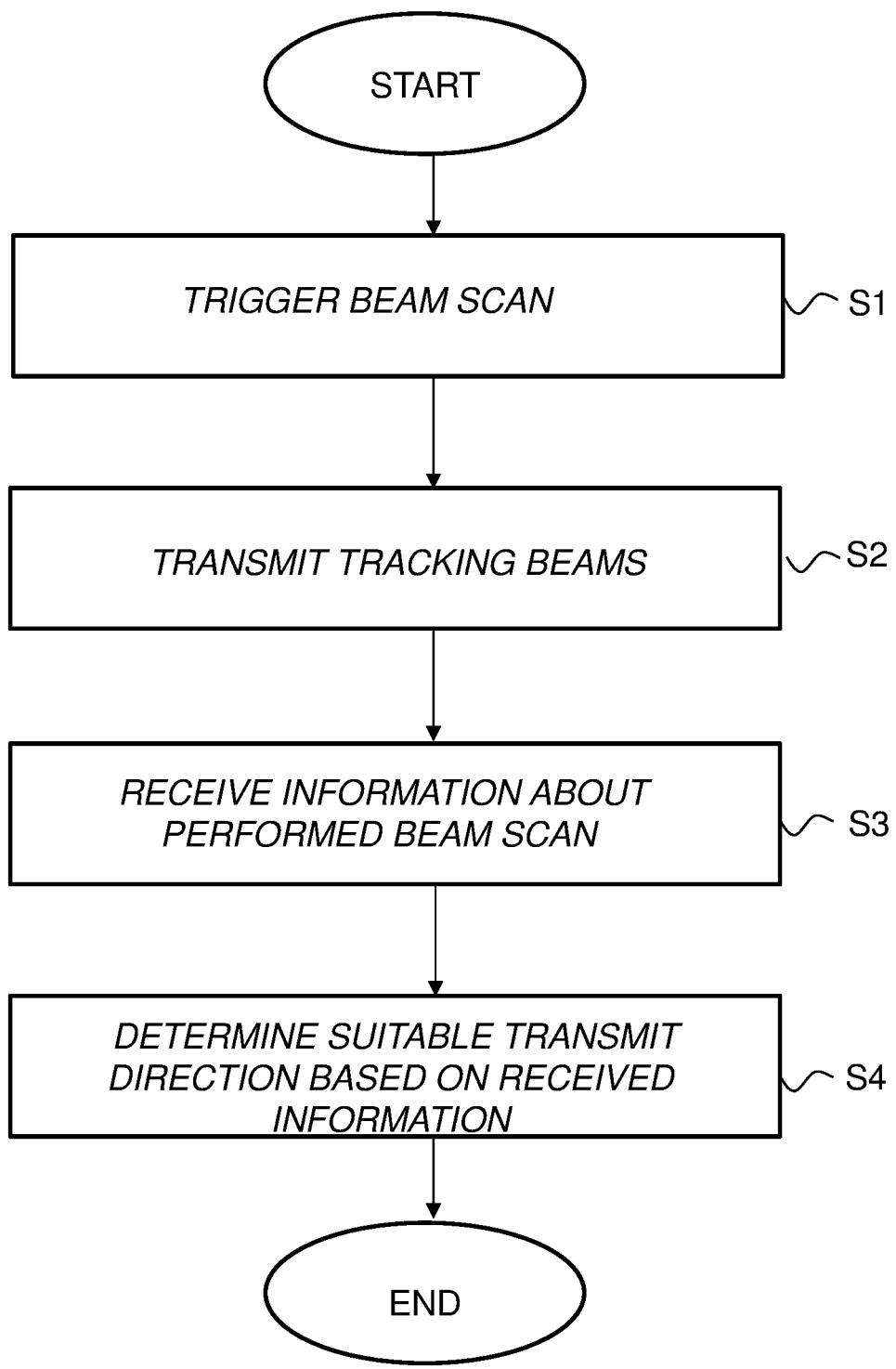
FIG. 1 is a flow diagram illustrating a method according to the proposed technology.

According to a particular aspect of the proposed technology there is provided a method performed by a transmitting communication device 10 for determining beam directions suitable to use for communication between the transmitting communication device 10 and a receiving communication device 20, the transmitting communication device 10 and the receiving communication device 20 being connected through an existing radio link. The method comprises the step S1 of triggering, by means of a message transmitted over the existing radio link, the receiving communication device 20 to perform a beam scan. The method also comprises the step S2 of transmitting, according to a pre-determined transmission scheme, tracking beams in different transmit directions, to enable the receiving communication device 20 to perform the beam scan for each transmit direction in order to detect a transmitted tracking beam. The method also comprises the step S3 of receiving information about the outcome of the performed beam scan from the receiving communication device 20 over the existing radio link, the information comprising information that enables the transmitting communication device to identify at least one transmit direction that led to a detection of a tracking beam during the performed beam scan. The method also comprises the step S4 of determining, based on the received information, a suitable transmit direction to use for beamformed transmissions to the receiving communication device 20. FIG. 1 provides a schematic flow diagram illustrating the method.

The method thus described illustrates how a transmitting communication device 10 cooperates with a corresponding receiving communication device in order to determine new transmit directions to use for beamformed transmissions when the transmit directions that are used begin to fail or show decreasing link quality. The fact that the transmitting communication device 10 and the receiving communication device 20 are able to communicate over an existing, working radio link, or radio connection, are utilized to ensure that information relevant for the method can be transferred between the devices. This existing radio link is thus used by the transmitting device to transmit information to the receiving device that trigger the latter to begin the beam scan. The information may be incorporated as control information in a message or transmitted to the receiving device in some other message transmitted according to some accepted radio standard. After having triggered the receiving communication device to begin the beam scan, the transmitting communication device may proceed and begin transmitting tracking beams. The tracking beams may be transmitted in various transmit directions according to details of a pre-determined transmission scheme.

Having transmitted the tracking beams in a number of transmit directions the method proceeds and receives information from the receiving communication device 20 relating to the outcome of the beam scan performed by the receiving communication device 20 to detect tracking beams. This information contains relevant features that enable the transmitting device to determine a suitable transmit direction to use for future communication with the receiving device. Examples of such features will be provided in what follows.

According to a particular embodiment of the proposed technology, there is provided a method where the transmitting communication device 10 and the receiving communication device 20 are synchronized to a common time. The synchronization of the transmitting- and receiving communication devices clocks ensure that there can be a time synchronized cooperation between the two nodes.

According to another particular embodiment there is provided a method wherein the step S1 of triggering is initiated based on information about the signal quality of a particular beam already used for communication between the transmitting communication device 10 and the receiving communication device 20, whereby a message triggering the beam scan is transmitted to the receiving communication device 20 if the signal quality of the beam is below a specified threshold.

In other words, if a transmitting communication device obtain information that the radio link quality related to a particular transmit direction is beginning to falter, the transmitting communication device may initiate the procedure and perform the step S1 to trigger the receiving communication device beam scan. The information may, for example, be obtained from the receiving communication device in the form of measurement values of entities relevant for determining the radio link quality, one particular example being the signal-to-interference-to noise ratio, SINR. The threshold value use may thus be the value defining an accepted level of SINR.

Still another embodiment of the proposed technology provides a method wherein the step S2 of transmitting tracking beams is performed based on a predetermined transmission scheme that comprises information about the time intervals during which tracking beams are transmitted over particular transmit directions.

In other words, according to this embodiment, may the tracking beams, for example, be transmitted in various transmit direction during corresponding time intervals as controlled by a predetermined transmission scheme. That is, the tracking beams may first be transmitted in a first transmit direction during a first time interval, after the expiration of this particular time interval the transmitting communication device 10 may switch transmit direction and transmit in the new direction during a second time interval, etc., until tracking beams has been transmitted in a number of possible transmit directions. The pre-determined transmission scheme may also comprise further information relating to the transmission of tracking beams. Such information may, for example, relate to the time points for particular transmissions, the time intervals during which transmission is performed over particular transmit directions and the number of transmit directions.

By way of example, the proposed technology provides a method that further comprises to transmit the information of the pre-determined transmission scheme to the receiving communication device 20 over the existing radio link.

By providing the receiving communication device with the information of the predetermined transmission scheme it will be possible for the receiving device to adapt its beam scan to the particular transmission scheme. Hence it may choose to turn the beam scan off in case the predetermined transmission scheme carries information that no tracking beams are transmitted during a particular time interval. This will ensure that there will be no unnecessary power losses due to beam scanning during non-active transmission periods.

An exemplary version of this embodiment provides a method wherein the information of the pre-determined transmission scheme is transmitted to the receiving communication device 20 in the message triggering the receiving communication device 20 to perform the beam scan.

A possible version of the proposed method provides a method wherein the step S3 of receiving information about the outcome of the performed beam scan comprises to receive information about at least one detection time when a tracking beam was detected by the receiving communication device 20, whereby a suitable transmit direction can be determined by relating the detection time with the time when a tracking beam was transmitted.

This particular embodiment provides an efficient way to determine a suitable transmit direction since it only requires that a small amount of information is needed to determine the transmit direction. Hence if the receiving communication device 20 register the time when a tracking beam was detected and transmit the registered time to the transmitting communication device 10, the transmitting communication device 20 will be able to compare the registered time with information relating to the transmission of tracking beams in particular transmit directions as given by the predetermined transmission scheme.

Another possible version of the proposed method pertains to a method wherein each tracking beam transmitted in a particular transmit direction carries identity information that enable the receiving communication device 20 to extract the identity of a detected tracking beam and relay the information back to the transmitting communication device 10.

According to a particular version there is provided a method wherein the step S3 of receiving information about the outcome of the performed beam scan comprises to receive information about the identity of at least one detected tracking beam, whereby a suitable transmit direction is determined to be the transmit direction corresponding to the identified tracking beam.

These particular embodiments provides for an alternative way to identify a transmit direction that led to a detection during the beam scan. The transmitting communication device incorporates identity information relating to a particular tracking beam in the signals carried by the tracking beam. Hence the receiving communication device 20 may decode the content of the detected beam to obtain the identity information and relay the information back to the transmitting communication device. This information enables the transmitting communication device to relate the identity information with a particular tracking beam and a particular direction. This is an economic alternative since only a minor amount of information needs to be transmitted between the cooperating devices.

As has been mentioned earlier, the receiving communication device 20 may also perform measurements on the detected tracking beams in order to obtain a measure of the radio link associated to a particular transmit direction. This may, in case a number of tracking beams in different transmit directions were detected, lead to a case where several radio link quality measures are transmitted to the transmitting communication device 10. One particular embodiment relevant to this scenario relates to a method wherein the step S4 of determining a suitable transmit direction, in the case where the received information comprises several identified transmit directions and the corresponding quality measures, comprises to select the specific transmit direction associated to the measure that yields the best quality. The best quality may for example be the highest SINR-value.

According to an optional embodiment there is provided a method wherein the transmitting communication device 10 is a radio base station.

According to another optional embodiment there is provided a method wherein the transmitting communication device 10 is a wireless device.

Still another optional embodiment discloses a method wherein the receiving communication device 20 is a wireless device.

Having described the workings of the transmitting communication device in detail in what follows there will be a description of the method performed by the receiving communication device. This method complements the method performed by the transmitting communication device, and enables the determination of a suitable transmit direction for upcoming beamformed transmissions. Certain positive features described in the sections describing the method performed by the transmitting communication device are equally relevant here and will not be reiterated.

Figure 2:
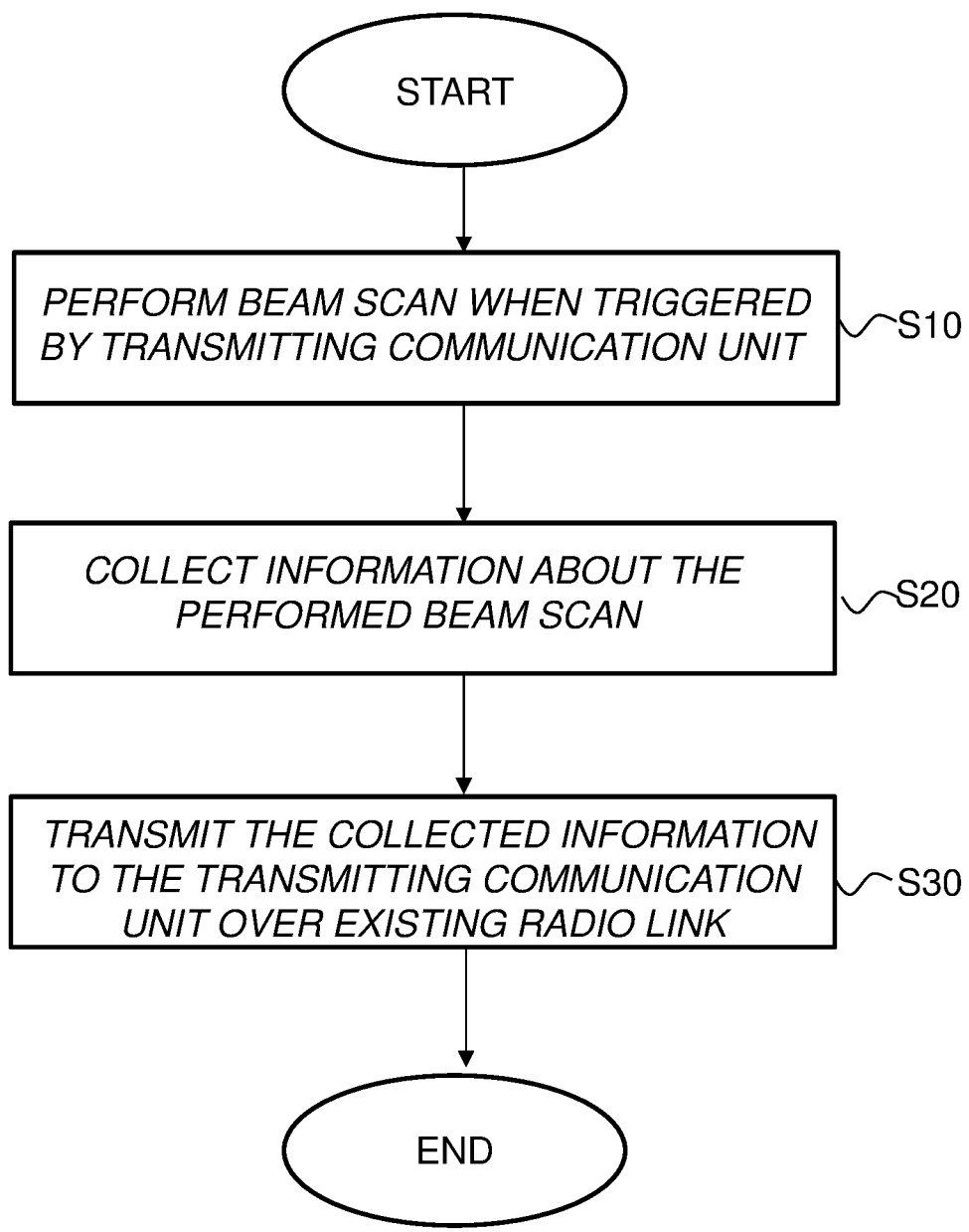
FIG. 2 is a flow diagram illustrating a beam scanning method according to the proposed technology.

Hence the proposed technology also provides a beam scanning method performed by a receiving communication device 20 to enable the determination of beam directions suitable to use for communication between the receiving communication device 20 and a transmitting communication device 10, the receiving communication device 20 and the transmitting communication device 10 being connected through an existing radio link. The method comprises the step S10 of performing, when triggered by a message received from the transmitting communication device 10 over the existing radio link, a beam scan over different receive directions in order to detect tracking beams transmitted by the transmitting communication device 10. The method also comprises the step S20 of collecting information about the outcome of the performed beam scan, the information comprising information that enables the transmitting communication device 10 to identify at least one transmit direction corresponding to a detected tracking beam. The method further comprises the step S30 of transmitting the collected information to the transmitting communication device 10 over the existing radio link. A schematic flow diagram illustrating the method is provided by FIG. 2.

The beam scanning method described above complements the earlier described method performed by the transmitting communication device 10, and a particular purpose is to perform the beam scan in order to detect certain tracking beams and collect information relating to detected tracking beams and transmit the collected information back to the transmitting communication device 10 to enable the latter to determine a suitable transmit direction. The beam scan is triggered by means of a message received over the existing radio link and is performed over different receive directions. When a beam has been detected certain information relating to the detection or the detected beam is collected. Examples of the particular information concerned will be provided below. The collected information is then transmitted to the transmitting communication device.

According to a particular embodiment of the proposed technology there is provided a method wherein the receiving communication device 10 and the transmitting communication device 20 are synchronized to a common time. The synchronization of the transmitting- and receiving communication devices clocks ensure that there can be a time synchronized cooperation between the two nodes.

Still another embodiment of the proposed technology provides a method wherein the step S10 of performing a beam scan comprises to perform a beam scan adapted to a pre-determined transmission scheme used by the transmitting communication device 10 when transmitting tracking beams, the transmission scheme comprising information about the time intervals during which a tracking beam is transmitted over a particular transmit direction. The predetermined transmission scheme has been described earlier with regard to the method performed by the transmitting communication device and it will not be iterated here.

Yet another embodiment of the proposed technology provides a method wherein the information of the pre-determined transmission scheme is obtained in a message received over the existing radio link.

By way of example, there is provided an embodiment of the proposed method wherein the message that comprises the information of the pre-determined transmission scheme comprises the message that is used to trigger the beam scan.

A particular embodiment pertains to a method wherein the step S20 of collecting information comprises to register the detection time of at least one tracking beam detected by the receiving communication device 20, and wherein the step S30 of transmitting comprises to transmit the registered detection time to the transmitting communication device 10 over the existing radio link to enable the transmitting communication device 10 to relate the detection time with the time when a tracking beam was transmitted.

This embodiment ensures that if the receiving communication device 20 register the time when a tracking beam was detected and transmit the registered time to the transmitting communication device 10, the transmitting communication device 20 will be able to compare the registered time with information relating to the transmission of tracking beams in particular transmit directions as given by the predetermined transmission scheme.

Yet another embodiment of the proposed technology provides a method wherein the step S20 of collecting information comprises to decode the content of a detected tracking beam in order to extract identity information that identifies the tracking beam, and wherein the step S30 of transmitting information comprises to transmit the identity information to the transmitting communication device over the existing radio link to enable the transmitting communication device to relate the identity information with a particular transmit direction.

According to this alternative way to enable an identification of the transmit direction the receiving communication device 20 decode the content of a detected beam to obtain identity information incorporated in the tracking beam. Having decoded the content the information is the transmitted back to the transmitting communication device to enable transmitting communication device to relate the identity information with a particular tracking beam and a particular direction. This is an economic alternative since only a minor amount of information needs to be transmitted between the cooperating devices Still another embodiment pertains to a method wherein the step S20 of collecting information also comprises to determine, for at least a subset of the detected tracking beams, a quality measure of the radio link corresponding to the detected tracking beams, and wherein the step S30 of transmitting also comprises to transmit the quality measure to enable the transmitting communication device 10 to associate the quality measure with an identified transmit direction. That is, the receiving communication device may perform certain measurements on the detected tracking beams in order to obtain a measure of the radio link quality associated to the transmit direction. Measurements may relate to measurements of SINR-values or to some other relevant entity that provides a quality indication of the radio link. The method proceeds and transmit information comprising the measured values to the transmitting communication device to enable the latter to determine a suitable transmit direction to use based at least partially on the obtained measurement values.

According to a particular embodiment of the proposed technology there is provided a method wherein the beam scan over different receive directions is performed for pre-determined receive directions.

The beam scanning method may thus be performed over a discrete number of predetermined receive directions. FIG. 5 illustrates a particular example where four different receive directions are used. Any suitable number of receive directions may however be used. Predetermined receive directions simplifies the method and also provides for an efficient and less power consuming beam scanning.

An optional embodiment of the proposed method provides for a method wherein the step S30 of transmitting information comprises to transmit the information as soon as it has been collected. That is, as soon as a tracking beam has been detected the method transmit the relevant information to the transmitting communication device to enable the latter to determine whether the transmit direction of the detected tracking beam furnish a suitable transmit direction for future beamformed transmission between the transmitting communication device and the receiving communication device. This particular embodiment provides a way to quickly finish the methods for determining suitable transmit directions since the methods may be terminated as soon as a specific transmit direction been determined.

Another optional embodiment provides instead a method wherein the step S30 of transmitting information comprises to transmit the information after all, or a number of, receive directions has been scanned and after all information corresponding to the outcome of the beam scan in the receive directions has been collected. This embodiment reduces the amount of signaling between the devices and provides an economical alternative to the embodiment where the information is transmitted as soon as it was collected.

According to a possible embodiment of the proposed technology the receiving communication device 20 is a wireless device.

Another possible embodiment of the proposed technology provides a method wherein the receiving communication device 20 is a radio base station.

The transmitting communication device 10 may be either a wireless device or a radio base station in the described embodiments.

Figure 8:
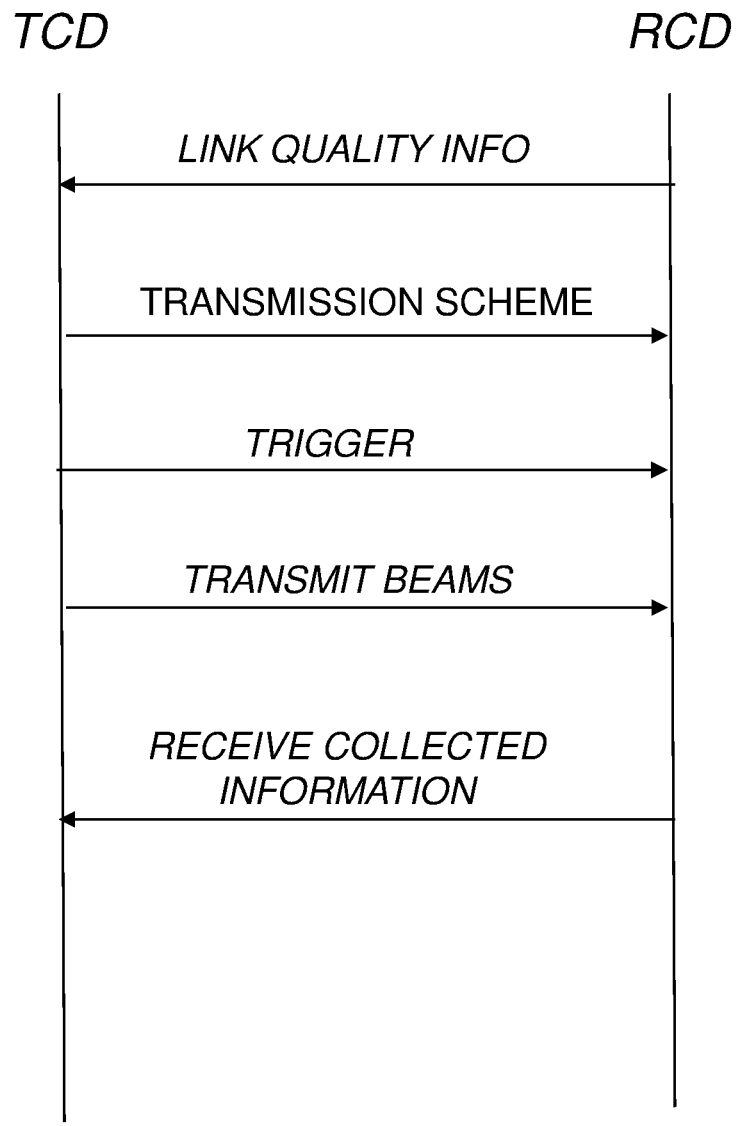
FIG. 8 is an alternative signaling diagram illustrating how a transmitting communication device and a receiving communication device may communicate in order to perform another particular embodiment of the proposed technology.

To further illustrate the earlier described cooperating methods a short example is provided. The example is illustrated by the signalling diagram of FIG. 8. This example is merely intended to facilitate the understanding and should not be construed as limiting. Assume in the following example that the transmitting communication device and the receiving communication device are coordinated with a radio link providing a radio connection to enable the exchange of information relating to the performed procedure. Assume further that the transmitting communication device and the receive communication device are synchronized to a common time, that is, they have a common knowledge of the time slot structure of the link which could either be of LTE type or different from that. According to the present example, the transmit side, that is, the transmitting communication device, obtains feedback information regarding a particular used beam indicating that the link quality is not sufficient. This may for example be done by the receiving communication device through measurements on the existing link quality and reported back to the transmitting communication device side with control information elements. The transmitting communication device may then evaluate the received quality information and decide that the link needs to be improved. A beam scan to find better beam directions should thus be initiated. The transmitting communication device triggers the receiving communication device to perform a beam scan by means of a triggering message. The transmitting communication device may signal the details of the procedure, i.e., provide the information of a predetermined transmission scheme according to which tracking beam transmissions are performed. Having done this the transmitting communication device starts to transmit beams in other directions than the currently used beam, in effect performing a tracking beam transmission over a number of possible transmit directions. This is done according to the pattern prescribed by the predetermined transmission scheme.

The receiving communication device initiates its scan pattern and scans the possible, or predetermined or selected, receive directions in order to try to determine the direction of any energy from the transmitted tracking beam. Here it is beneficial that the transmit actions and receive actions are coordinated in time, i.e. that the devices are time synchronized. It may also be an advantage that the transmissions of the transmitting communication device is controlled by a transmission scheme that allows for a low enough transmission rate so as to allow the receiving communication device to perform a beam scan for at least a number of the possible receive directions. In some cases, for example in cases with a small number of predetermined receive directions, it may be preferable if the receiving communication device is allowed to perform a beam scan over all receive directions. Information relating to the signal quality of the scanned receive beam direction may be collected. In case a particular a beam direction results in a link of sufficient quality, the information is sent back to the transmitting communication device over the existing radio link device to enable the latter to determine the transmit direction used for the detected tracking beam. Note that the receiving communication device may scan its full set of possible receive directions, for each of the transmit directions used by the transmitting communication device before reporting the outcome or alternatively report the findings as quick as possible.

An alternative procedure of the proposed technology that may is deemed relevant in particular scenarios relates to an embodiment where the two communication devices, the receiving communication device 20 and the transmitting communication device 10, comprises a radio base station 100 and a wireless device 200, respectively. In this particular embodiment the wireless device 200 aims to find suitable transmit directions to use for upcoming beamformed transmissions to the radio base station. A particular detail in this scenario is that the receiving device 100, the radio base station in this case, may be the device that triggers the procedure. Below follows a description of the methods needed to handle this scenario. It should be noted that all relevant method steps described in relation to the embodiments pertaining to the method performed by the transmitting communication device 10 and the beam scanning method performed by receiving communication device equally well may be used in the methods described below. These particular embodiments will however not be described again. Moreover, all described advantages and effects relating to the earlier described methods are equally valid in the methods to be described and will therefore not be reiterated.

Figure 3:
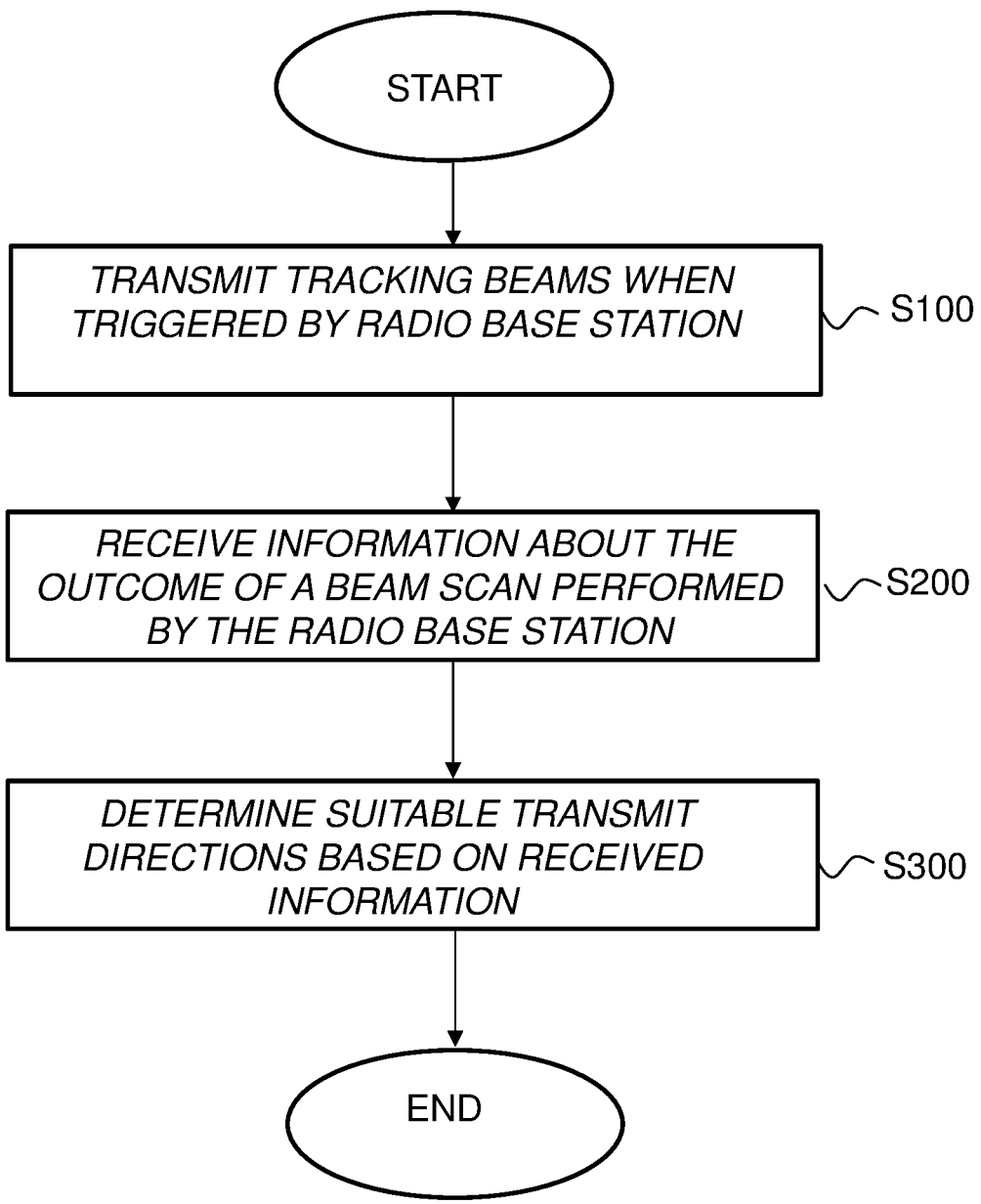
FIG. 3 is a flow diagram illustrating an alternative method according to the proposed technology.

So according to this particular aspect of the proposed technology there is provided a method performed by a wireless device 100 for determining beam directions suitable to use for communication between the wireless device 100 and a radio base station 200, the wireless device 100 and the radio base station 200 being connected through an existing radio link. The method comprises the step S100 of transmitting, when triggered by a message received from the radio base station 100 and according to a pre-determined transmission scheme, tracking beams in different transmit directions to enable the radio base station 200 to perform the beam scan for each transmit direction in order to detect a transmitted tracking beam. The method also comprises the step S200 of receiving information about the outcome of the performed beam scan from the radio base station 200 over the existing radio link, said information comprising information that enables the wireless device 100 to identify at least one transmit direction that led to a detection of a tracking beam during the performed beam scan. The method further comprises the step S300 of determining, based on the received information, a suitable transmit direction to use for beamformed transmissions to the radio base station 200. The method is illustrated schematically in the flow diagram in FIG. 3.

Figure 4:
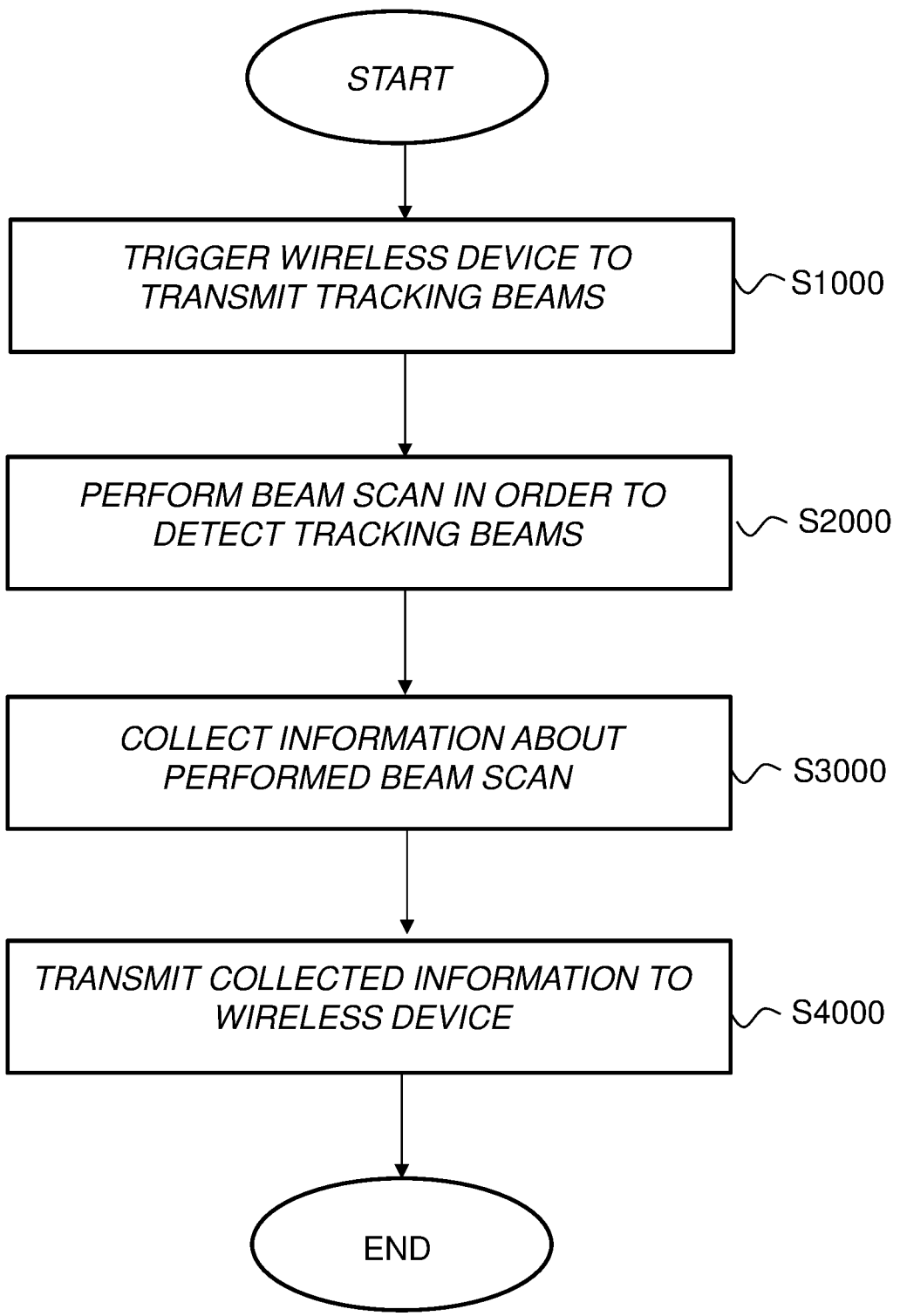
FIG. 4 is a flow diagram illustrating an alternative beam scanning method according to the proposed technology.

The above described method is complemented by a beam scanning method performed by a radio base station 200 to enable the determination of beam directions suitable to use for communication between the radio base station 200 and a wireless device 100, the radio base station 200 and the wireless device 100 being connected through an existing radio link. The method comprises the step S1000 of triggering, by means of a message transmitted over the existing radio link, the wireless device 100 to perform a transmission of tracking beams. The method also comprises the step of performing S2000 a beam scan in order to detect tracking beams transmitted by the wireless device 100. The method further comprises the step S3000 of collecting information about the outcome of the performed beam scan, said information comprising information that enables the wireless device 100 to identify at least one transmit direction corresponding to a detected tracking beam. The method further comprises the step S4000 of transmitting the collected information to the wireless device 10 over the existing radio link. This method is schematically illustrated in the flow diagram of FIG. 4.

Figure 9:
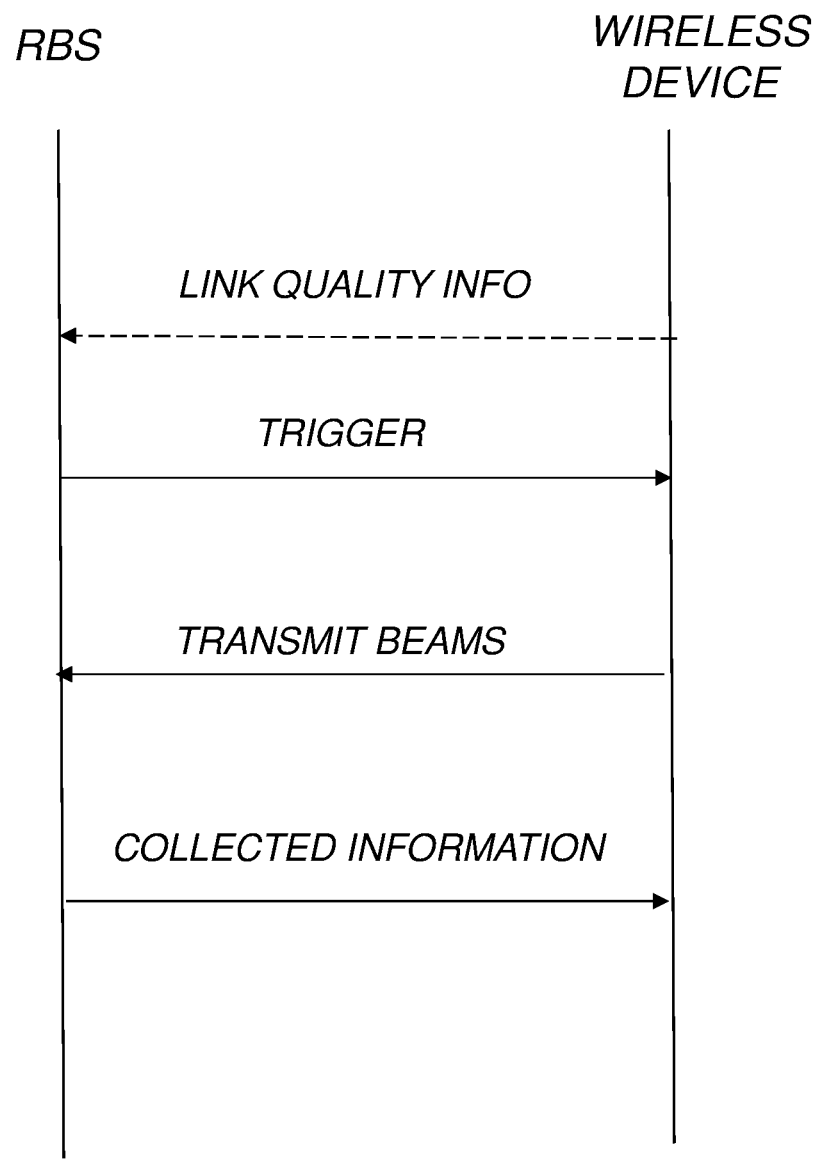
FIG. 9 is still another signaling diagram illustrating how a transmitting communication device and a receiving communication device may communicate in order to perform yet another particular embodiment of the proposed technology.

The signaling diagram of FIG. 9 illustrates a particular signaling for the cooperating methods performed by the wireless device 100 and radio base station 200. In this particular example the wireless device indicates, via a message transmitted over the existing radio link comprising radio link quality information, to the radio base station 200 that the radio link quality may be insufficient. The radio base station 200 may evaluate the quality measure and based on the evaluation trigger the wireless device 100 to perform a tracking beam transmission. The radio base station 200 initiates the beam scan in order to detect energy from the transmission, the radio base station collects the information and transmit it to the wireless device 100 to enable the wireless device to determine a suitable transmit direction for beamformed transmissions to the radio base station.

The proposed technology also provides devices that are configured to perform the steps of the disclosed methods. Accordingly there is provided a transmitting communication device 10 configured for determining beam directions suitable to use for communication between the transmitting communication device 10 and a receiving communication device 20, the transmitting communication device 10 and the receiving communication device 20 being connected through an existing radio link.

The transmitting communication device 10 is configured to trigger, by means of a message transmitted over the existing radio link, the receiving communication device 20 to perform a beam scan. The transmitting communication device 10 is also configured to transmit, according to a pre-determined transmission scheme, tracking beams in different transmit directions, to enable the receiving communication device 20 to perform the beam scan for each transmit direction in order to detect a transmitted tracking beam. The transmitting communication device 10 is also configured to receive information about the outcome of the performed beam scan from the receiving communication device 20 over the existing radio link, the information comprising information that enables the transmitting communication device to identify at least one transmit direction that led to a detection of a tracking beam during the performed beam scan. The transmitting communication device 10 is also configured to determine, based on the received information, a suitable transmit direction to use for beamformed transmissions to the receiving communication device 20.

A particular embodiment of the proposed technology provides a transmitting communication device 10, wherein the transmitting communication device 10 is synchronized with the receiving communication device 20 to a common time.

Another possible embodiment of the proposed technology provides a transmitting communication device 10 wherein the transmitting communication device 10 is configured to trigger the beam scan based on information about the signal quality of a particular beam already used for communication between the transmitting communication device 10 and receiving communication device 20, and configured to transmit a message to the receiving communication device 20 if the signal quality of the beam is below a specified threshold.

Still another embodiment of the proposed technology provides a transmitting communication device 10 wherein the transmitting communication device 10 is configured to transmit tracking beams in transmit directions based on a pre-determined transmission scheme that comprises information about the time intervals during which tracking beams are transmitted over particular transmit directions.

Yet another embodiment of the proposed technology provides a transmitting communication device 10 wherein the transmitting communication device 10 is configured to transmit the information of the pre-determined transmission scheme to the receiving communication device 20 over the existing radio link.

By way of example, the proposed technology provides a transmitting communication device 10 wherein the transmitting communication device 10 is configured to transmit the information of the pre-determined transmission scheme to the receiving communication device 20 in the message that trigger the receiving communication device 20 to perform the beam scan.

A possible embodiment of the proposed technology provides a transmitting communication device 10 wherein the transmitting communication device 10 is configured to receive information about the outcome of the performed beam scan that comprises information about at least one detection time when a tracking beam was detected by the receiving communication device 20, and configured to determine a suitable transmit direction by relating the detection time with the time when a tracking beam was transmitted.

An exemplary embodiment of the proposed technology provides a transmitting communication device 10 wherein the transmitting communication device 10 is configured to transmit tracking beams that carries identity information that enable the receiving communication device 20 to extract the identity of a detected tracking beam and relay the information back to the transmitting communication device 10.

Another particular embodiment of the proposed technology provides a transmitting communication device 10 wherein the transmitting communication device 10 is configured to receive information about the outcome of the performed beam scan that comprises information about the identity of at least one detected tracking beam, and configured to determine that a suitable transmit direction is the transmit direction corresponding to the identified tracking beam.

An optional embodiment of the proposed technology discloses a transmitting communication device 10 wherein the transmitting communication device 10 is configured to determine a suitable transmit direction, in the case where the received information comprises several identified transmit directions and the corresponding quality measures, by selecting the specific transmit direction associated to the measure that yields the best quality.

Another optional embodiment provides a transmitting communication device 10 wherein the transmitting communication device 10 is a radio base station.

Still another optional embodiment discloses a transmitting communication device 10 wherein the transmitting communication device 10 is a wireless device.

Figure 11A:
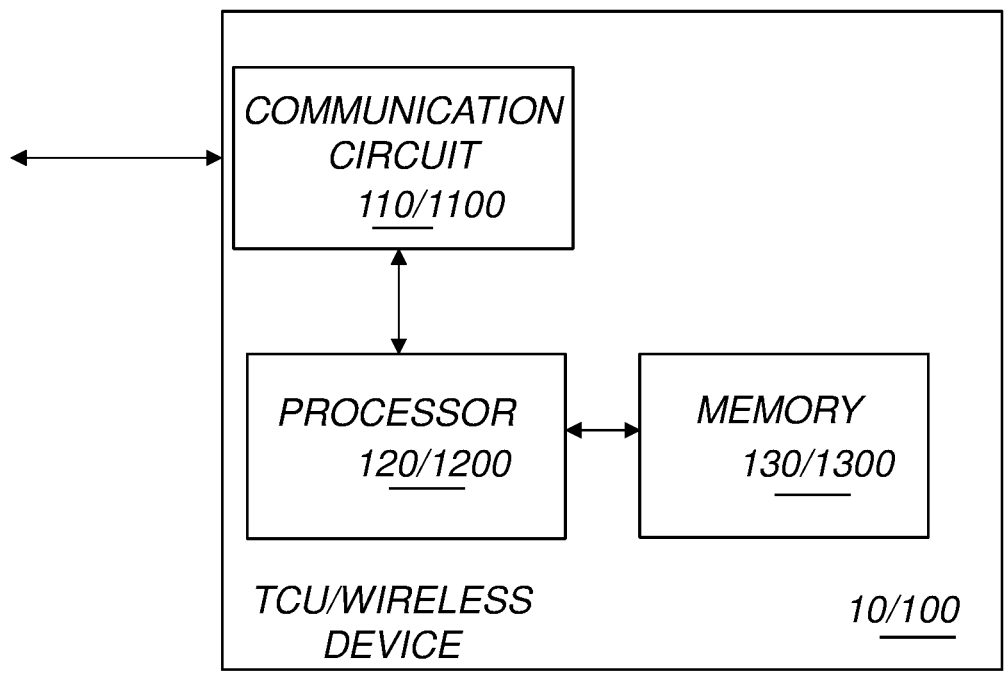
FIG. 11A is a block diagram illustrating a possible embodiment of a transmitting communication device configured to perform a particular method according to the proposed technology.

A possible embodiment of the transmitting communication device 20 according to the present disclosure provides a transmitting communication device 20 that comprises a communication circuitry 130, a processor 110 and a memory 220, the memory 120 comprising instructions executable by the processor 110, whereby the processor 110 is operative to determine a suitable transmit direction to use for upcoming beamformed transmissions. This embodiment is schematically illustrated in FIG. 11A.

In the disclosed transmitting communication device 20, it is possible that at least some of the steps described are implemented in a computer program, which is loaded into the memory for execution by processing circuitry including one or more processors. The processor(s) and memory are interconnected to each other to enable normal software execution. An optional input/output device may also be interconnected to the processor(s) and/or the memory to enable input and/or output of relevant data such as input parameter(s) and/or resulting output parameter(s).

The term 'processor' should here be interpreted in a general sense as any system or device capable of executing program code or computer program instructions to perform a particular processing, determining or computing task.

The processing circuitry including one or more processors is thus configured to perform, when executing the computer program, well-defined processing tasks such as those described herein.

The processing circuitry does not have to be dedicated to only execute the above-described steps but may also execute other tasks.

Figure 12:
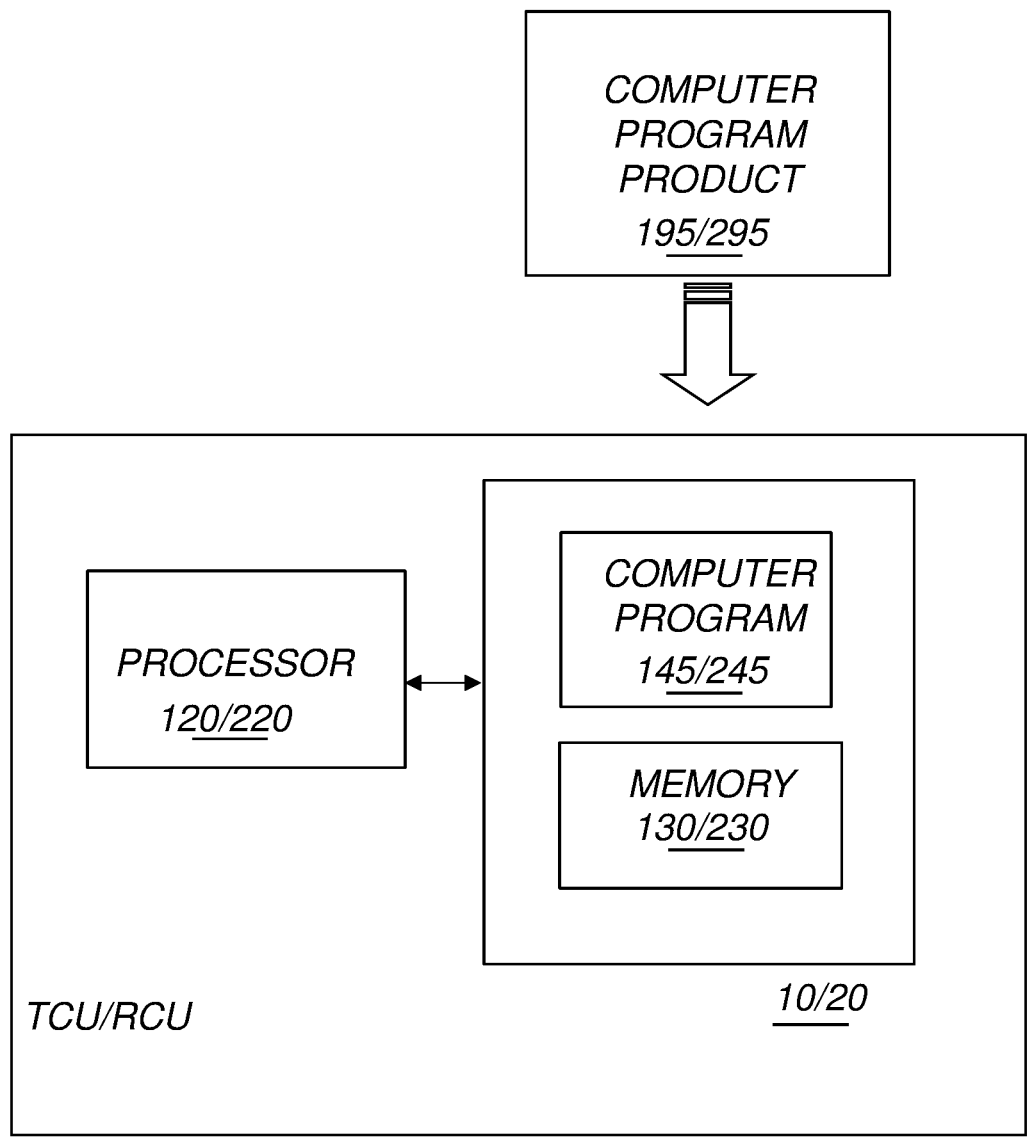
FIG. 12 is a block diagram illustrating how a computer program according to the proposed technology can be utilized in a receiving communication device or a transmitting communication device according to the proposed technology.

In a particular embodiment, schematically illustrated in FIG. 12, there is illustrated use of a computer program. The computer program 145 comprising instructions, which when executed by at least one processor, cause the at least one processor to:
- initiate a transmission of a message to a receiving communication unit 20 over an existing radio link in order to trigger the receiving unit 20 to perform a beam scan;
- initiate a transmission of tracking beams in transmit directions that alternates over time, where a switch of transmit direction may be made at specific intervals, to enable the receiving communication unit 20 to perform a beam scan for each transmit direction in order to detect a transmitted tracking beam;
- read information about the outcome of the performed beam scan, said information comprising information of at least one transmit direction that led to a detection of a tracking beam during the performed beam scan;
- determine, based on the read information, a suitable transmit direction to use for beamformed transmissions to the receiving communication unit 20.

The proposed technology also provides a carrier comprising the computer program 145, wherein the carrier is one of an electronic signal, an optical signal, an electromagnetic signal, a magnetic signal, an electric signal, a radio signal, a microwave signal, or a computer-readable storage medium.

The proposed technology also provides a device configured to perform the earlier describe beam scanning method. To this end there is provided a receiving communication device 20 configured to perform a beam scan to enable the determination of beam directions suitable to use for communication between the receiving communication device 20 and a transmitting communication device 10, the receiving communication device 20 and the transmitting communication device 10 being connected through an existing radio link. The receiving communication device 20 is configured to perform, when triggered by a message received from the transmitting communication device 10 over the existing radio link, a beam scan over different receive directions in order to detect tracking beams transmitted by the transmitting communication device 10. The receiving communication device 20 is also configured to collect information about the outcome of the performed beam scan, the information comprising information that enables the transmitting communication device 10 to identify at least one transmit direction corresponding to a detected tracking beam. The receiving communication device 20 is also configured to transmit the collected information to the transmitting communication device 10 over the existing radio link.

A particular embodiment of the proposed technology provides a receiving communication device 20 wherein the receiving communication device 20 are synchronized with the transmitting communication device 10 to a common time.

Another possible embodiment of the proposed technology disclose a receiving communication device 20 wherein the receiving communication device 20 is configured to perform a beam scan adapted to a pre-determined transmission scheme used by the transmitting communication device 10 when transmitting tracking beams, the transmission scheme comprising information about the time intervals during which a tracking beam is transmitted over a particular transmit direction.

Still another possible embodiment provide a receiving communication device 20, wherein the receiving communication device 20 is configured to obtain the information of the pre-determined transmission scheme in a message received over the existing radio link.

According to an optional embodiment of the proposed technology it is provided a receiving communication device 20, wherein the receiving communication device 20 is configured to obtain the information from the message used to trigger the beam scan.

By way of example, the proposed technology discloses a receiving communication device 20 wherein the receiving communication device 20 is configured to register the detection time of at least one tracking beam detected by the receiving communication device 20, and configured to transmit the registered detection time to the transmitting communication device 10 over the existing radio link to enable the transmitting communication device 10 to relate the detection time with the time when a tracking beam was transmitted.

A possible embodiment of the proposed device relates to a receiving communication device 20 wherein the receiving communication device 20 is configured to decode the content of a detected tracking beam in order to extract identity information that identifies the tracking beam, and configured to transmit the identity information to the transmitting communication device 10 over the existing radio link to enable the transmitting communication 10 unit to relate the identity information with a particular transmit direction.

In a particular embodiment of the proposed technology is the receiving communication device 20 configured to determine, for at least a subset of the detected tracking beams, a quality measure of the radio link corresponding to the detected tracking beams, and wherein the receiving communication device 20 is configured to transmit the quality measure to the transmitting communication device 10 to enable the transmitting communication device 10 to associate the quality measure with an identified transmit direction.

An optional embodiment of the present receiving communication device 20 comprises a receiving communication device 20 that is configured to perform the beam scan over different pre-determined receive directions.

A possible and optional embodiment provides a receiving communication device 20 that is configured to transmit the collected information as soon as it has been collected.

Another possible optional embodiment provides a receiving communication device 20 that is configured to transmit the collected information after all, or a number of, the receive directions has been scanned and after all information corresponding to the outcome of the beam scan in the receive directions has been collected.

Figure 11B:
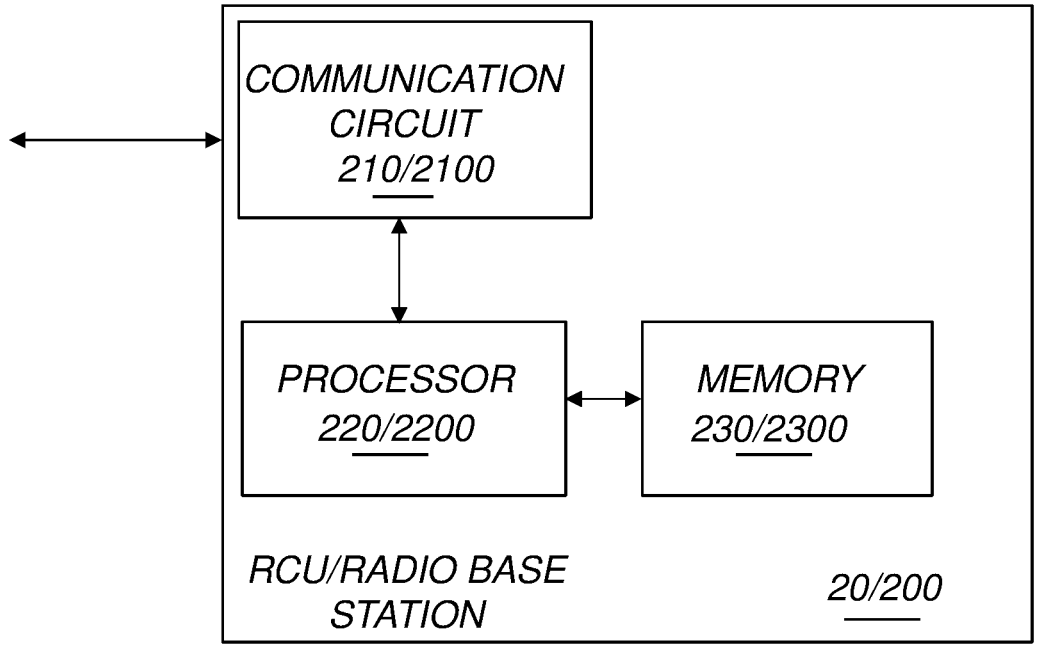
FIG. 11B is a block diagram illustrating a possible embodiment of a receiving communication device configured to perform a particular method according to the proposed technology.

A possible embodiment of a receiving communication device 29 is schematically illustrated in FIG. 11B. The depicted receiving communication device comprises a communication circuitry 210, a processor 220 and a memory 230, the memory 230 comprising instructions executable by the processor 220, whereby the processor 220 is operative to enable the determination of a suitable transmit direction to be used for upcoming beamformed transmissions.

The receiving communication device 20 is, according to a particular embodiment of the proposed technology, a wireless device.

Another possible embodiment of the proposed technology discloses a receiving communication device 20 that is a radio base station.

In the disclosed receiving communication device 20, it is possible that at least some of the steps described are implemented in a computer program, which is loaded into the memory for execution by processing circuitry including one or more processors. The processor(s) and memory are interconnected to each other to enable normal software execution. An optional input/output device may also be interconnected to the processor(s) and/or the memory to enable input and/or output of relevant data such as input parameter(s) and/or resulting output parameter(s).

The term 'processor' should here be interpreted in a general sense as any system or device capable of executing program code or computer program instructions to perform a particular processing, determining or computing task.

The processing circuitry including one or more processors is thus configured to perform, when executing the computer program, well-defined processing tasks such as those described herein.

The processing circuitry does not have to be dedicated to only execute the above-described steps but may also execute other tasks.

In a particular embodiment, schematically illustrated in FIG. 12, there is illustrated the use of a computer program. The computer program 245 comprising instructions, which when executed by at least one processor, cause the at least one processor to:
 initiate a beam scan over different receive directions in order to detect tracking beams transmitted by a transmitting communication unit 10;
 collect information about the outcome of the performed beam scan, said information comprising information that enables the transmitting communication unit 10 to identify at least one transmit direction corresponding to a detected tracking beam;
 create a message to be transmitted to the transmitting communication unit 10 that comprises the collected information.

The proposed technology also provides a carrier comprising the computer program 245, wherein the carrier is one of an electronic signal, an optical signal, an electromagnetic signal, a magnetic signal, an electric signal, a radio signal, a microwave signal, or a computer-readable storage medium.

The proposed technology also provides a wireless device for determining beam directions suitable to use for communication between the wireless device and a radio base station. To this end there is provided a wireless device 100 configured to determine beam directions suitable to use for communication between the wireless device 100 and a radio base station 200, the wireless device 100 and the radio base station 200 being connected through an existing radio link. The wireless device 100 is configured to transmit, when triggered by a message received from the radio base station 100 over the existing radio link and according to a pre-determined transmission scheme, tracking beams in different transmit directions, to enable the radio base station 200 to perform the beam scan for each transmit direction in order to detect a transmitted tracking beam. The wireless device 100 is also configured to receive information about the outcome of the performed beam scan from the radio base station 200 over the existing radio link, said information comprising information that enables the wireless device 100 to identify at least one transmit direction that led to a detection of a tracking beam during the performed beam scan. The wireless device 100 is further configured to determine, based on the received information, a suitable transmit direction to use for beamformed transmissions to the radio base station 200.

A possible embodiment of a wireless device 200 is schematically illustrated in FIG. 11A. The depicted receiving communication device comprises a communication circuitry 330, a processor 310 and a memory 320, the memory 320 comprising instructions executable by the processor 310, whereby the processor 310 is operative to determinate of a suitable transmit direction to be used for upcoming beamformed transmissions.

In the disclosed wireless device 100, it is possible that at least some of the steps described are implemented in a computer program, which is loaded into the memory for execution by processing circuitry including one or more processors. The processor(s) and memory are interconnected to each other to enable normal software execution. An optional input/output device may also be interconnected to the processor(s) and/or the memory to enable input and/or output of relevant data such as input parameter(s) and/or resulting output parameter(s).

The term 'processor' should here be interpreted in a general sense as any system or device capable of executing program code or computer program instructions to perform a particular processing, determining or computing task.

The processing circuitry including one or more processors is thus configured to perform, when executing the computer program, well-defined processing tasks such as those described herein.

The processing circuitry does not have to be dedicated to only execute the above-described steps but may also execute other tasks.

Figure 13:
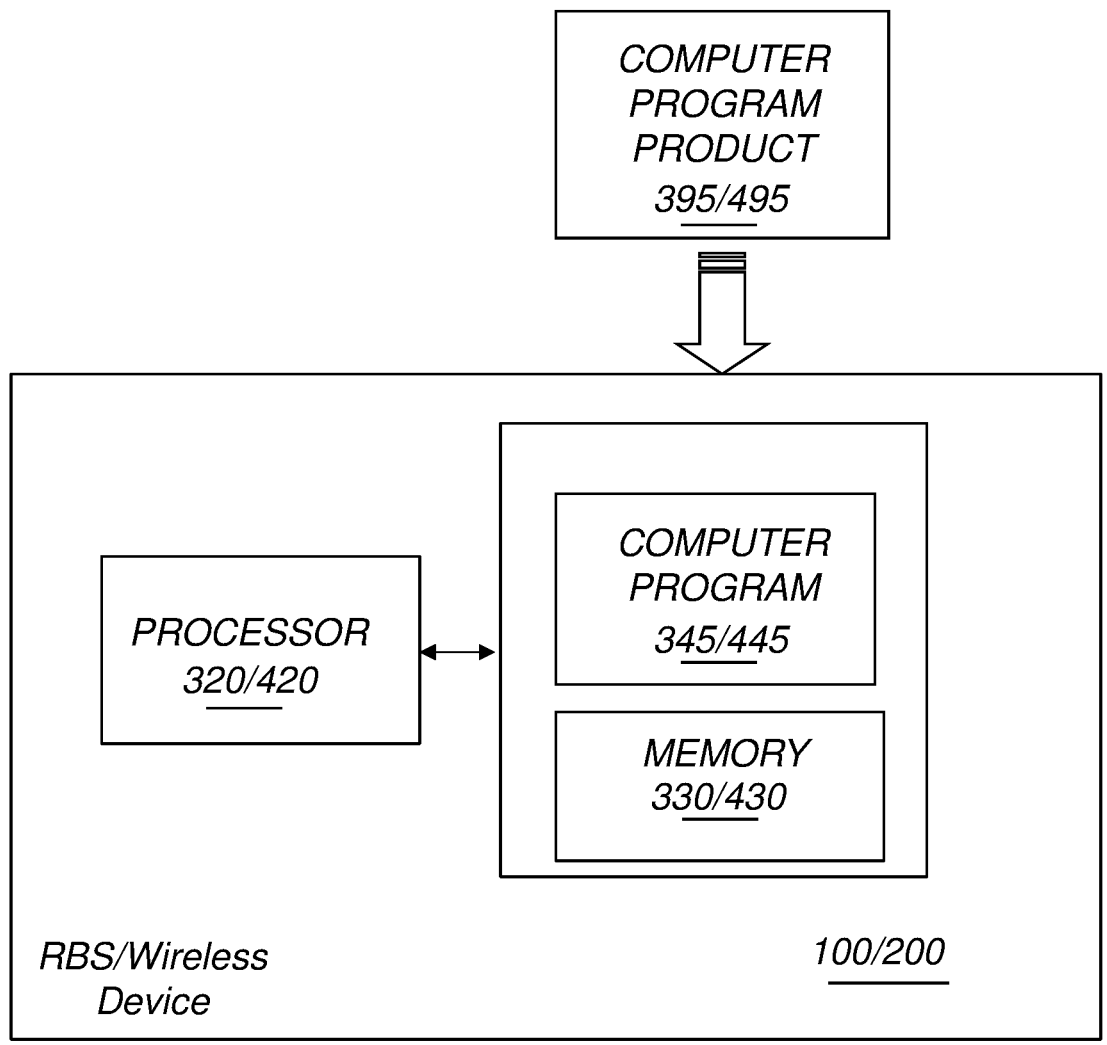
FIG. 13 is a block diagram illustrating how a computer program according to the proposed technology can be utilized in a wireless device or a radio base station according to the proposed technology

In a particular embodiment, schematically illustrated in FIG. 13, there is illustrated the use of a computer program. The computer program 345 comprising instructions, which when executed by at least one processor, cause the at least one processor to:
 initiate a transmission of tracking beams in different transmit directions according to a pre-determined transmission scheme, to enable a radio base station 200 to perform a beam scan for each transmit direction in order to detect a transmitted tracking beam
 read information about the outcome of the performed beam scan said information comprising information of at least one transmit direction that led to a detection of a tracking beam during the performed beam scan
 determine, based on the read information, a suitable transmit direction to use for beamformed transmissions to the radio base station 200.

The proposed technology also provides a carrier comprising the computer program 345, wherein the carrier is one of an electronic signal, an optical signal, an electromagnetic signal, a magnetic signal, an electric signal, a radio signal, a microwave signal, or a computer-readable storage medium.

The proposed technology also provides a radio base station 200 that is configured to perform a beam scan to enable the determination of beam directions suitable to use for communication between the radio base station 200 and a wireless device 100, the radio base station 200 and the wireless device 100 being connected through an existing radio link. The radio base station 200 is configured to trigger, by means of a message transmitted over the existing radio link, the wireless device 100 to perform a transmission of tracking beams in different transmit directions according to a pre-determined transmission scheme. The radio base station 200 is also configured to perform a beam scan in order to detect tracking beams transmitted by the wireless device 100. The radio base station 200 is further configured to collect information about the outcome of the performed beam scan, said information comprising information that enables the wireless device 100 to identify at least one transmit direction corresponding to a detected tracking beam. The radio base station 200 is configured to transmit the collected information to the wireless device 100 over the existing radio link.

A possible embodiment of the radio base station 200 is schematically illustrated in FIG. 11B. The depicted receiving communication device comprises a communication circuitry 2100, a processor 2200 and a memory 2300, the memory 2300 comprising instructions executable by the processor 2200, whereby the processor 2200 is operative to enable the determination of a suitable transmit direction to be used for upcoming beamformed transmissions.

In the provided radio base station 200, it is possible that at least some of the steps described are implemented in a computer program, which is loaded into the memory for execution by processing circuitry including one or more processors. The processor(s) and memory are interconnected to each other to enable normal software execution. An optional input/output device may also be interconnected to the processor(s) and/or the memory to enable input and/or output of relevant data such as input parameter(s) and/or resulting output parameter(s).

The term 'processor' should here be interpreted in a general sense as any system or device capable of executing program code or computer program instructions to perform a particular processing, determining or computing task.

The processing circuitry including one or more processors is thus configured to perform, when executing the computer program, well-defined processing tasks such as those described herein.

The processing circuitry does not have to be dedicated to only execute the above-described steps but may also execute other tasks.

In a particular embodiment, schematically illustrated in FIG. 13, there is illustrated the use of a computer program. The computer program 445 comprising instructions, which when executed by at least one processor, cause the at least one processor to:
- initiate the transmission of a message to a wireless device 100 over an existing radio link to trigger the wireless device 100 to perform a transmission of tracking beams in different transmit directions according to a predetermined transmission scheme
- initiate a beam scan in order to detect tracking beams transmitted by the wireless device 100
- collect information about the outcome of the performed beam scan, said information comprising information of at least one transmit direction that led to a detected tracking beam
- create a message, comprising the collected information, to be transmitted to the wireless device 100 over the existing radio link.

The proposed technology also provides a carrier comprising the computer program 235, wherein the carrier is one of an electronic signal, an optical signal, an electromagnetic signal, a magnetic signal, an electric signal, a radio signal, a microwave signal, or a computer-readable storage medium.

As used herein the non-limiting term communication device may refer to either a wireless device or a network node such as a radio base station.

As used herein, the non-limiting terms "User Equipment" and "wireless device" may refer to a mobile phone, a cellular phone, a Personal Digital Assistant, PDA, equipped with radio communication capabilities, a smart phone, a laptop or Personal Computer, PC, equipped with an internal or external mobile broadband modem, a tablet PC with radio communication capabilities, a target device, a device to device UE, a machine type UE or UE capable of machine to machine communication, iPAD, customer premises equipment, CPE, laptop embedded equipment, LEE, laptop mounted equipment, LME, USB dongle, a portable electronic radio communication device, a sensor device equipped with radio communication capabilities or the like. In particular, the term "UE" and the term "wireless device" should be interpreted as non-limiting terms comprising any type of wireless device communicating with a radio network node in a cellular or mobile communication system or any device equipped with radio circuitry for wireless communication according to any relevant standard for communication within a cellular or mobile communication system.

As used herein, the non-limiting term "radio network node" may refer to base stations, network control nodes such as network controllers, radio network controllers, base station controllers, and the like. In particular, the term "base station" may encompass different types of radio base stations including standardized base stations such as Node Bs, or evolved Node Bs, eNBs, and also macro/micro/pico radio base stations, home base stations, also known as femto base stations, relay nodes, repeaters, radio access points, base transceiver stations, BTSs, and even radio control nodes controlling one or more Remote Radio Units, RRUs, or the like.

Optionally, the wireless device, UE, network node may also include communication circuitry. The communication circuitry may include functions for wired and/or wireless communication with other devices and/or network nodes in the network. In a particular example, the wireless device, UE, network node may include radio circuitry for communication with one or more other nodes, including transmitting and/or receiving information. The communication circuitry may be interconnected to the processor and/or memory.

The steps, functions, procedures, modules and/or blocks described herein may be implemented in hardware using any conventional technology, such as discrete circuit or integrated circuit technology, including both general-purpose electronic circuitry and application-specific circuitry.

Particular examples include one or more suitably configured digital signal processors and other known electronic circuits, e.g. discrete logic gates interconnected to perform a specialized function, or Application Specific Integrated Circuits (ASICs).

By way of example, the disclosed software or computer programs may be realized as a computer program product 195; 295; 395; 495, which is normally carried or stored on a computer-readable medium, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

The flow diagram or diagrams presented herein may be regarded as a computer flow diagram or diagrams, when performed by one or more processors. A corresponding apparatus such as a communication device, wireless device or radio base station may be defined as a group of function modules, where each step performed by the processor corresponds to a function module. In this case, the function modules are implemented as a computer program running on the processor. Hence, the communication device, the wireless device and the radio base station may alternatively be defined as a group of function modules, where the function modules are implemented as a computer program running on at least one processor.

Figure 10:
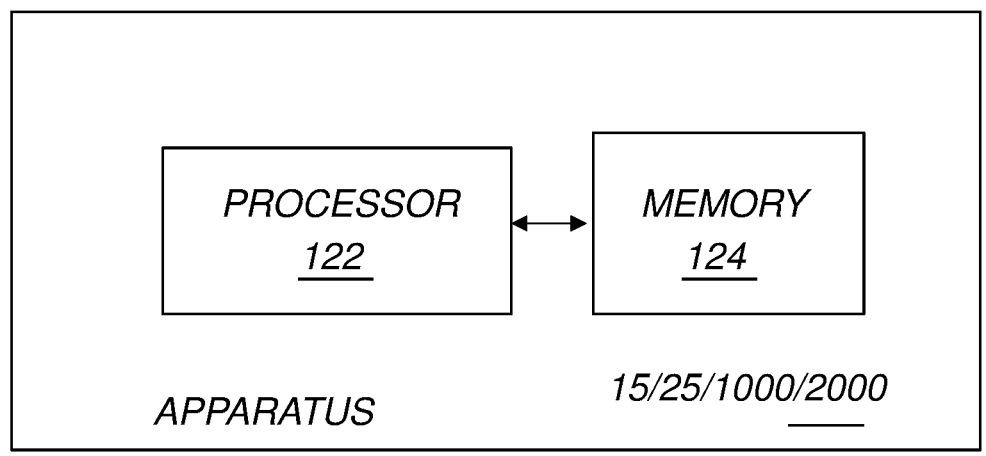
FIG. 10 is a block diagram illustrating a possible embodiment of an apparatus configured to perform a particular method according to the proposed technology.

A general apparatus that comprises a memory and a processor is schematically illustrated in FIG. 10.

The computer program residing in memory may thus be organized as appropriate function modules configured to perform, when executed by the processor, at least part of the steps and/or tasks described herein. An example of such function modules is illustrated in FIG. 14.

Figure 14:
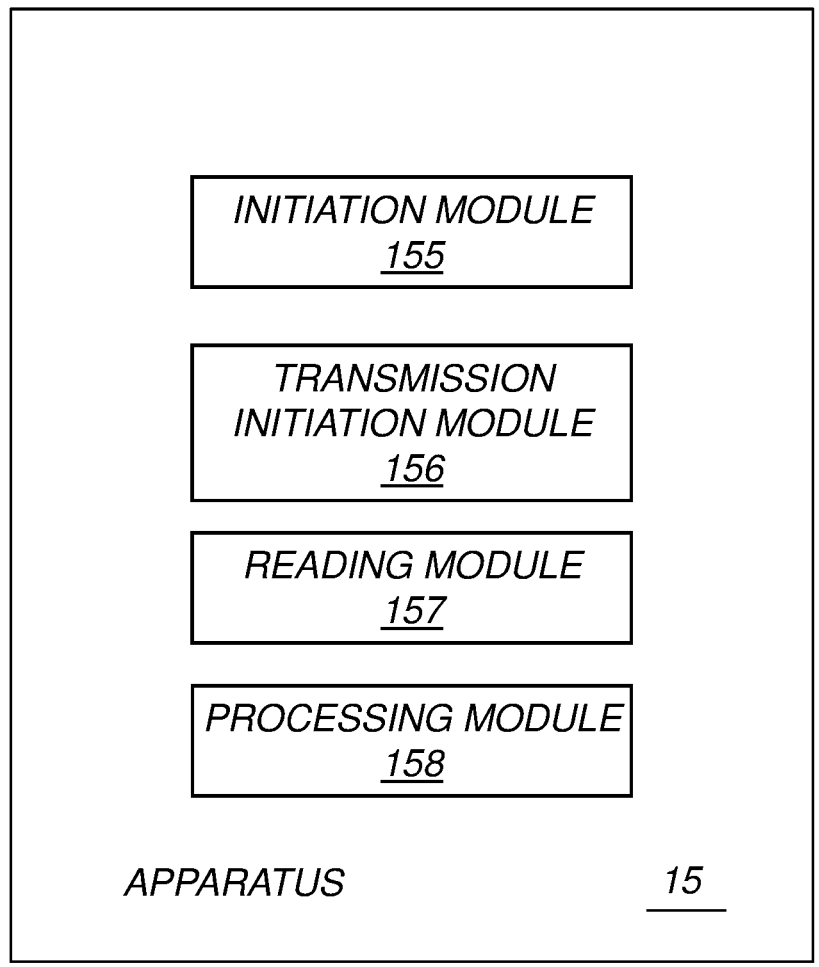
FIG. 14 is a flow diagram illustrating a particular apparatus according to the proposed technology.

FIG. 14 is a schematic block diagram illustrating an example of an apparatus comprising a group of function modules. In this particular embodiment there is illustrated an apparatus 15 for determining beam directions suitable to use for communication between a transmitting communication unit 10 and a receiving communication unit 20, the transmitting communication unit 10 and the receiving communication unit 20 being connected through an existing radio link, wherein the apparatus 15 comprises:
  an initiation module 155 for initiating the transmission of a message to a receiving communication unit 20 over an existing radio link in order to trigger the receiving unit 20 to perform a beam scan;
  a transmission initiation module 156 for initiating a transmission of tracking beams in different transmit directions according to a pre-determined transmission scheme, to enable the receiving communication unit 20 to perform a beam scan for each transmit direction in order to detect a transmitted tracking beam;
  a reading module 157 for reading information about the outcome of the performed beam scan, said information comprising information of at least one transmit direction that led to a detection of a tracking beam during the performed beam scan;
  a processing module 158 for determining, based on the read information, a suitable transmit direction to use for beamformed transmissions to the receiving communication unit 20.

The apparatus of FIG. 14 may, according to a particular embodiment be comprised in a communication device such as a radio base station or a wireless device.

Figure 15:
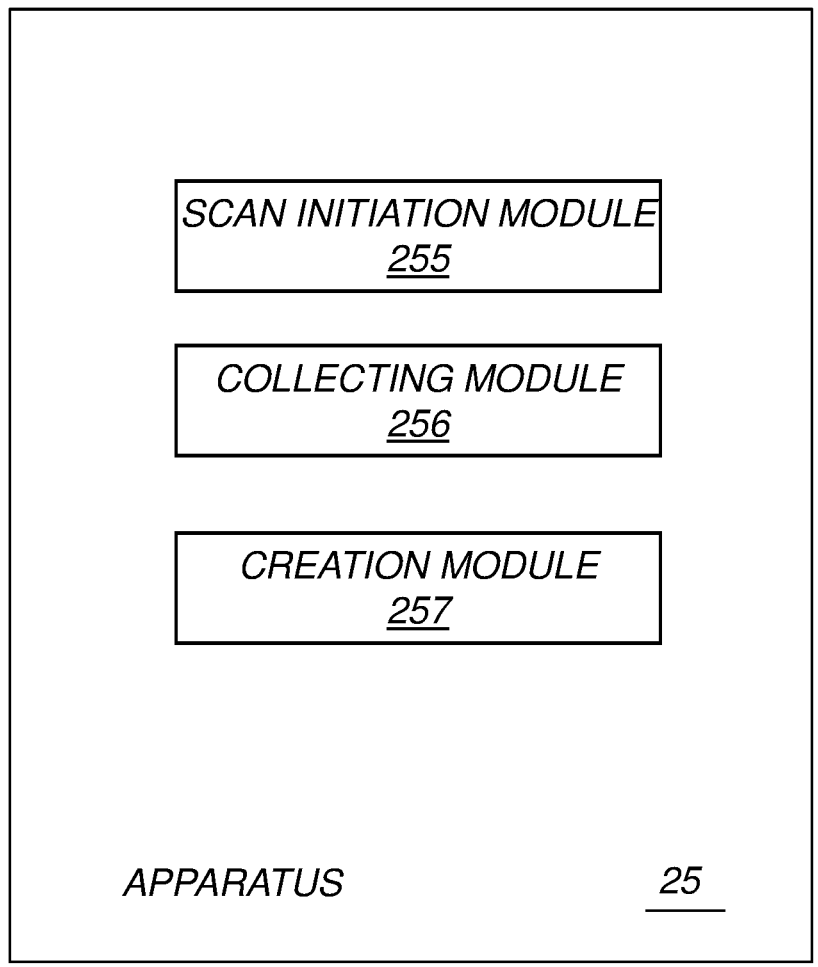
FIG. 15 is a flow diagram illustrating a particular apparatus according to another embodiment of the proposed technology.

FIG. 15 is a schematic block diagram illustrating another example of an apparatus comprising a group of function modules according to the proposed technology. This embodiment relates to an apparatus 25 for enabling the determination of beam directions suitable to use for communication between a receiving communication unit 20 and a transmitting communication unit 10, the receiving communication unit 20 and the transmitting communication unit 10 being connected through an existing radio link, wherein the apparatus 25 comprises:
  a scan initiation module 255 for initiating a beam scan over different receive directions in order to detect tracking beams transmitted by a transmitting communication unit 10;
  a collecting module 256 for collecting information about the outcome of the performed beam scan, said information comprising information that enables the transmitting communication unit 10 to identify at least one transmit direction corresponding to a detected tracking beam;
  a creation module 257 for creating a message to be transmitted to the transmitting communication unit (10 that comprises the collected information.

The apparatus of FIG. 15 may, according to a particular embodiment be comprised in a communication device such as a radio base station or a wireless device.

Figure 16:
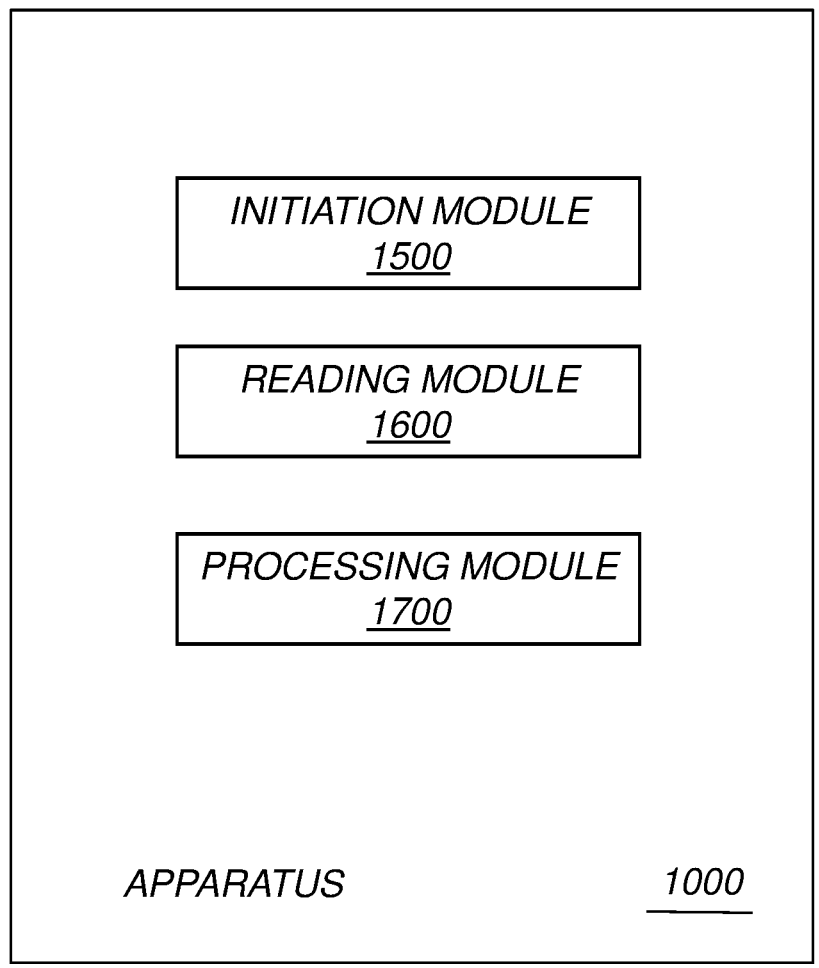
FIG. 16 is a flow diagram illustrating a particular apparatus according to still another embodiment of the proposed technology.

FIG. 16 is a schematic block diagram illustrating another example of an apparatus comprising a group of function modules according to the proposed technology. This embodiment relates to an apparatus 1000 for determining beam directions suitable to use for communication between a wireless device 100 and a radio base station 200, the wireless device 100 and the radio base station 200 being connected through an existing radio link. The apparatus comprises:
  an initiation module 1500 for initiating a transmission of tracking beams in different transmit directions according to a pre-determined transmission scheme, to enable a radio base station 200 to perform a beam scan for each transmit direction in order to detect a transmitted tracking beam;
  a reading module 1600 for reading information about the outcome of the performed beam scan said information comprising information of at least one transmit direction that led to a detection of a tracking beam during the performed beam scan;
  a processing module 1700 for determining, based on the read information, a suitable transmit direction to use for beamformed transmissions to the radio base station 200.

The apparatus of FIG. 16 may, according to a particular embodiment be comprised in a wireless device.

Figure 17:
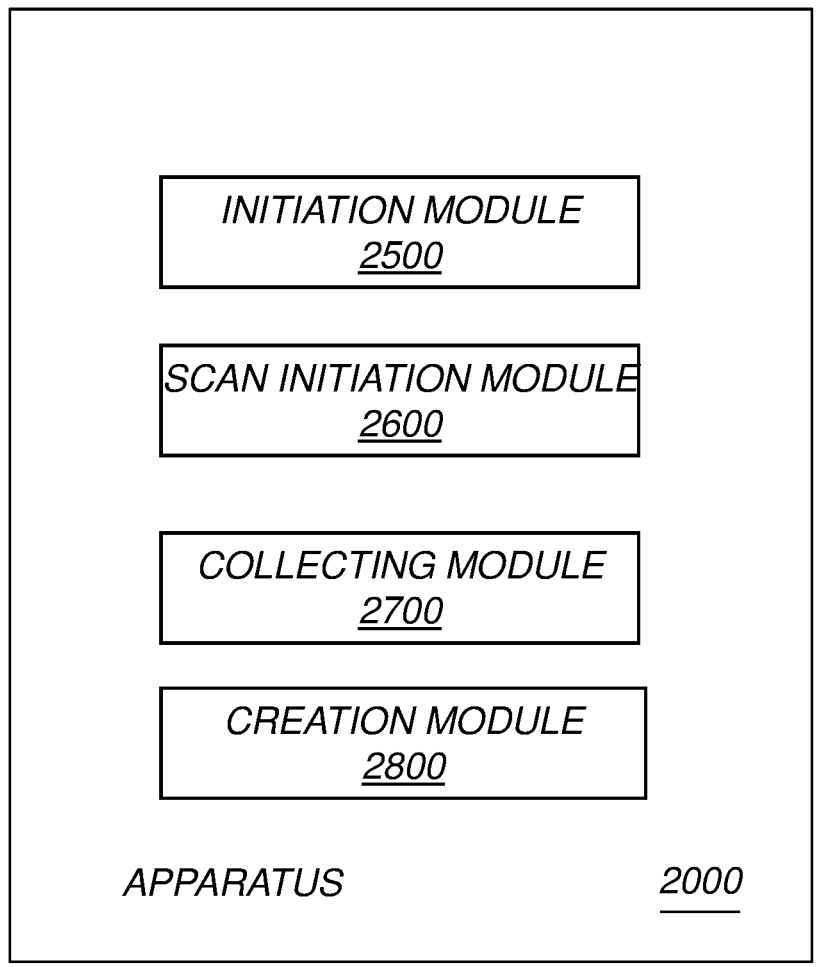
FIG. 17 is a flow diagram illustrating a particular apparatus according to yet another embodiment of the proposed technology.

FIG. 17 is a schematic block diagram illustrating another example of an apparatus comprising a group of function modules according to the proposed technology. This embodiment relates to an apparatus 2000 for enabling the determination of beam directions suitable to use for communication between a radio base station 200 and a wireless device 100, the radio base station 200 and the wireless device 100 being connected through an existing radio link. The apparatus wherein the radio base comprises:
  an initiation module 2500 for initiating the transmission of a message to a wireless device 100 over an existing radio link triggering the wireless device 100 to perform a transmission of tracking beams in different transmit directions according to a pre-determined transmission scheme;
  a scan initiation module 2600 for initiating a beam scan in order to detect tracking beams transmitted by the wireless device 100;
  a collecting module 2700 for collecting information about the outcome of the performed beam scan, said information comprising information of at least one transmit direction that led to a detected tracking beam;
  a creation module 2800 for creating a message, to be transmitted to the wireless device 10, comprising the collected information.

The apparatus of FIG. 17 may, according to a particular embodiment be comprised in a radio base station.

Alternatively it is possibly to realize the modules in FIGS. 14, 15, 16 and 17 predominantly by hardware modules, or alternatively by hardware, with suitable interconnections between relevant modules. Particular examples include one or more suitably configured digital signal processors and other known electronic circuits, e.g. discrete logic gates interconnected to perform a specialized function, and/or Application Specific Integrated Circuits (ASICs) as previously mentioned. Other examples of usable hardware include input/output (I/O) circuitry and/or circuitry for receiving and/or sending signals. The extent of software versus hardware is purely implementation selection.

It will be appreciated that the methods and devices described herein can be combined and re-arranged in a variety of ways.

For example, embodiments may be implemented in hardware, or in software for execution by suitable processing circuitry, or a combination thereof.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

What is claimed is:

1. A method performed by a transmitting communication unit for determining beam directions to use for communication between the transmitting communication unit and a receiving communication unit, the transmitting communication unit and the receiving communication unit being connected through an existing radio link, wherein the method comprising:
    transmitting a message over the existing radio link to trigger the receiving communication unit to perform a beam scan;
    transmitting, according to a pre-determined transmission scheme, tracking beams in different transmit directions for the receiving communication unit to perform the beam scan to detect a transmitted tracking beam;
    receiving information relating to the outcome of the performed beam scan from the receiving communication unit over the existing radio link; and
    determining, based on the received information, a transmit direction to use for beamformed transmissions to the receiving communication unit.

2. The method according to claim 1, wherein the transmitting communication unit and the receiving communication unit are synchronized to a common time.

3. The method according to claim 1, wherein the trigger is initiated based on information about signal quality of a particular beam already used for communication between the transmitting communication unit and the receiving communication unit, wherein the message to trigger the beam scan is transmitted to the receiving communication unit if the signal quality of the beam is below a specified threshold.

4. The method according to claim 1, wherein the transmitting the tracking beams is performed based on the pre-determined transmission scheme that comprises information about time intervals during which tracking beams are transmitted over particular transmit directions.

5. The method according to claim 1 further comprising transmitting information of the pre-determined transmission scheme to the receiving communication unit over the existing radio link.

6. The method according to claim 5, wherein the information of the pre-determined transmission scheme is transmitted to the receiving communication unit in the message to trigger the receiving communication unit to perform the beam scan.

7. The method according to claim 1, wherein the receiving the information relating to the outcome of the performed beam scan further comprises receiving information about at least one detection time when a tracking beam was detected by the receiving communication unit, wherein a transmit direction is determined by relating the detection time with a time when the tracking beam was transmitted.

8. The method according to claim 1, wherein each tracking beam transmitted in a particular transmit direction carries identity information that enable the receiving communication unit to extract an identity of a detected tracking beam and relay the information back to the transmitting communication unit.

9. The method according to claim 8, wherein the receiving the information relating to the outcome of the performed beam scan further comprises receiving information about an identity of at least one detected tracking beam, wherein a transmit direction is determined to be the transmit direction corresponding to an identified tracking beam.

10. The method according to claim 1, wherein the determining the transmit direction, in a case where the received information comprises several identified transmit directions and corresponding quality measures, comprises selecting a specific transmit direction associated to a measure that yields a determined quality.

11. The method according to claim 1, wherein the transmitting communication unit is a radio base station.

12. The method according to claim 1, wherein the transmitting communication unit is a wireless device.

13. The method according to claim 1, wherein the receiving communication unit is a wireless device.

14. A method performed by a wireless device for determining beam directions to use for communication between the wireless device and a radio base station, the wireless device and the radio base station being connected through an existing radio link, wherein the method comprising:
    transmitting a message over the existing radio link to trigger the radio base station to perform beam scan;
    transmitting according to a pre-determined transmission scheme, tracking beams in different transmit directions for the radio base station to perform the beam scan to detect a transmitted tracking beam;
    receiving information relating to the outcome of the performed beam scan from the radio base station over the existing radio link; and
    determining, based on the received information, a transmit direction to use for beamformed transmissions to the radio base station.

15. A transmitting communication unit for determining beam directions to use for communication between the transmitting communication unit and a receiving communication unit that have an existing radio link, the transmitting communication unit comprising:
    a processor; and
    a memory, the memory comprising instructions which, when executed by the processor, cause the transmitting communication link to:
        transmit a message over the existing radio link to trigger the receiving communication unit to perform a beam scan;
        transmit, according to a pre-determined transmission scheme, tracking beams in different transmit directions for the receiving communication unit to perform the beam scan to detect a transmitted tracking beam;

receive information relating to the outcome of the performed beam scan from the receiving communication unit over the existing radio link; and determine, based on the received information, a transmit direction to use for beamformed transmissions to the receiving communication unit.

16. The transmitting communication unit according to claim 15, wherein the transmitting communication unit is synchronized with the receiving communication unit to a common time.

17. The transmitting communication unit according to claim 15, wherein the transmitting communication unit is configured to transmit tracking beams in transmit directions based on a pre-determined transmission scheme that comprises information about time intervals during which tracking beams are transmitted over particular transmit directions.

18. The transmitting communication unit according to claim 15, wherein the transmitting communication unit is to transmit information of the pre-determined transmission scheme to the receiving communication unit over the existing radio link.

19. The transmitting communication unit according to claim 18, wherein the transmitting communication unit is to transmit the information of the pre-determined transmission scheme to the receiving communication unit in the message to trigger the receiving communication unit to perform the beam scan.

20. The transmitting communication unit according to claim 15, wherein the transmitting communication unit is to transmit tracking beams that carry identity information that enable the receiving communication unit to extract an identity of a detected tracking beam and relay the information back to the transmitting communication unit.

21. The transmitting communication unit according to claim 20, wherein the transmitting communication unit is to receive information relating to the outcome of the performed beam scan that comprises information about the identity of at least one detected tracking beam, and configured to determine that a transmit direction is the transmit direction corresponding to the identity of the detected tracking beam.

22. The transmitting communication unit according to claim 15, wherein the transmitting communication unit is a radio base station.

23. The transmitting communication unit according to claim 15, wherein the transmitting communication unit is a wireless device.

24. A beam scanning method performed by a radio base station to enable determination of beam directions to use for communication between the radio base station and a wireless device, the radio base station and the wireless device being connected through an existing radio link, wherein the method comprising:

triggering, by a message transmitted over the existing radio link, the wireless device to perform a transmission of tracking beams;

performing a beam scan in order to detect tracking beams transmitted by the wireless device;

collecting information relating to the outcome of the performed beam scan, the information to enable the wireless device to identify at least one transmit direction corresponding to a detected tracking beam; and transmitting the collected information to the wireless device over the existing radio link.

* * * * *

UNITED STATES PATENT AND TRADEMARK OFFICE
CERTIFICATE OF CORRECTION

PATENT NO. : 11,601,175 B2
APPLICATION NO. : 17/450983
DATED : March 7, 2023
INVENTOR(S) : Wigren et al.

It is certified that error appears in the above-identified patent and that said Letters Patent is hereby corrected as shown below:

On the Title Page

In Column 1, below "Related U.S. Application Data", delete "(60)" and insert -- (63) --, therefor.

In the Specification

In Column 1, Line 11, delete "2020," and insert -- 2020 (now U.S. Pat. No. 11,184,068 issued Nov. 23, 2021), --, therefor.

In Column 2, Line 19, delete "with in a" and insert -- within a --, therefor.

In Column 9, Line 41, delete "relative the" and insert -- relative to the --, therefor.

In Column 10, Line 27, delete "time to," and insert -- time $t_0$, --, therefor.

In Column 10, Line 52, delete "signal-to-interference to noise ratio, SINR," and insert -- signal-to-interference-plus-noise ratio, SINR, --, therefor.

In Column 12, Line 40, delete "signal-to-interference-to noise ratio, SINR." and insert -- signal-to-interference-plus-noise ratio, SINR. --, therefor.

In Column 15, Lines 4-5, delete "receiving communication device 10" and insert -- receiving communication device 20 --, therefor.

In Column 15, Line 61, delete "is the" and insert -- is then --, therefor.

In Column 17, Lines 49-50, delete "particular a beam" and insert -- particular beam --, therefor.

Signed and Sealed this
Thirtieth Day of April, 2024

*Katherine Kelly Vidal*
Katherine Kelly Vidal
*Director of the United States Patent and Trademark Office*